(12) United States Patent
Gan et al.

(10) Patent No.: US 12,490,174 B2
(45) Date of Patent: Dec. 2, 2025

(54) COMMUNICATION METHOD BETWEEN MULTI-LINK DEVICES AND APPARATUS

(71) Applicant: Huawei Technologies Co., Ltd., Shenzhen (CN)

(72) Inventors: Ming Gan, Shenzhen (CN); Yuchen Guo, Shenzhen (CN); Yunbo Li, Shenzhen (CN); Dandan Liang, Shenzhen (CN); Jian Yu, Shenzhen (CN); Mao Yang, Xi'an (CN); Bo Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/738,985

(22) Filed: May 6, 2022

(65) Prior Publication Data

US 2022/0264429 A1 Aug. 18, 2022

Related U.S. Application Data

(63) Continuation of application No. PCT/CN2020/127299, filed on Nov. 6, 2020.

(30) Foreign Application Priority Data

Nov. 8, 2019 (CN) .......................... 201911089950.5
Mar. 12, 2020 (CN) ......................... 202010172040.X

(51) Int. Cl.
*H04W 48/08* (2009.01)
*H04L 1/1607* (2023.01)
(Continued)

(52) U.S. Cl.
CPC ........... *H04W 48/08* (2013.01); *H04L 1/1614* (2013.01); *H04W 52/0209* (2013.01);
(Continued)

(58) Field of Classification Search
CPC ..... H04W 48/00; H04W 48/08; H04W 52/00; H04W 52/02; H04W 52/0209;
(Continued)

(56) References Cited

U.S. PATENT DOCUMENTS

| 11,882,514 | B2 * | 1/2024 | Gan .................. H04L 5/0023 |
| 2013/0250832 | A1 * | 9/2013 | Kim .................. H04W 52/0206 370/311 |

(Continued)

FOREIGN PATENT DOCUMENTS

| CN | 103907388 A | 7/2014 |
| CN | 107113729 A | 8/2017 |

(Continued)

OTHER PUBLICATIONS

"IEEE Standard for Information technology-Telecommunications and information exchange between systems Local and metropolitan area networks-Specific requirements, Part 11: Wireless LAN Medium Access Control (MAC) and Physical Layer (PHY) Specifications," IEEE Std 802.11-2016, Total 3534 pages (Approved Dec. 7, 2016).

(Continued)

*Primary Examiner* — Warner Wong
(74) *Attorney, Agent, or Firm* — Leydig, Voit & Mayer, Ltd.

(57) ABSTRACT

Embodiments of this application provide a communication method between multi-link devices and an apparatus, and relate to the field of communications technologies, to reduce power consumption of a station multi-link device. The method includes: a multi-link device includes a plurality of STAs, one STA operates on one of a plurality of links, and the STA determines a primary link in the plurality of links. A STA operating on the primary link in the multi-link device may receive information sent by the AP indicating whether the STA operating on the primary link has a downlink traffic, (Continued)

and/or information indicating whether a STA operating on a link other than the primary link has a downlink traffic. Therefore, the STA operating on the primary link may determine a link on which the STA having a downlink traffic operates in the multi-link device.

28 Claims, 13 Drawing Sheets

(51) Int. Cl.
  *H04W 52/02* (2009.01)
  *H04L 69/14* (2022.01)
  *H04W 36/28* (2009.01)
  *H04W 72/044* (2023.01)
(52) U.S. Cl.
  CPC ............. *H04L 69/14* (2013.01); *H04W 36/28* (2013.01); *H04W 72/0473* (2013.01)
(58) Field of Classification Search
  CPC ......... H04W 52/0219; H04W 36/0027; H04W 36/28; H04W 24/06; H04W 52/0225; H04W 52/0251; H04W 52/0261; H04W 52/34; H04W 52/346; H04W 52/38; H04W 52/386; H04W 72/0473; H04L 1/12; H04L 1/16; H04L 1/1607; H04L 1/1614; H04L 9/3215; H04L 12/4018; H04L 69/14; H04L 25/0272; H04L 43/00
  See application file for complete search history.

(56) References Cited

U.S. PATENT DOCUMENTS

| | | | |
|---|---|---|---|
| 2014/0307602 A1 | 10/2014 | Seok | |
| 2015/0230244 A1 | 8/2015 | Choi et al. | |
| 2016/0081010 A1 | 3/2016 | Seok | |
| 2017/0295541 A1 | 10/2017 | Kim et al. | |
| 2019/0200404 A1 | 6/2019 | Yu et al. | |
| 2019/0268956 A1 | 8/2019 | Xiao et al. | |
| 2019/0335454 A1* | 10/2019 | Huang | H04W 72/542 |
| 2019/0364555 A1 | 11/2019 | Huang et al. | |
| 2020/0092881 A1 | 3/2020 | Nezou et al. | |
| 2020/0137683 A1* | 4/2020 | Cariou | H04W 74/002 |
| 2020/0396568 A1* | 12/2020 | Huang | H04W 76/40 |
| 2021/0007168 A1* | 1/2021 | Asterjadhi | H04W 52/0235 |
| 2021/0029588 A1* | 1/2021 | Cariou | H04W 28/0263 |
| 2021/0051513 A1* | 2/2021 | Min | H04W 72/21 |
| 2021/0144787 A1* | 5/2021 | Kwon | H04W 72/23 |
| 2021/0274574 A1* | 9/2021 | Ghosh | H04W 48/12 |
| 2021/0282047 A1* | 9/2021 | Cherian | H04W 4/80 |
| 2021/0321450 A1* | 10/2021 | Cariou | H04W 74/002 |
| 2021/0360522 A1* | 11/2021 | Chitrakar | H04W 72/0453 |
| 2021/0372571 A1 | 12/2021 | Park et al. | |
| 2021/0392571 A1* | 12/2021 | Kneckt | H04W 48/10 |
| 2022/0124857 A1* | 4/2022 | Patil | H04W 76/14 |
| 2022/0132610 A1 | 4/2022 | Guo et al. | |
| 2022/0159718 A1* | 5/2022 | Fang | H04W 74/0808 |
| 2022/0255849 A1* | 8/2022 | Huang | H04W 28/06 |
| 2022/0338285 A1* | 10/2022 | Zhou | H04W 8/24 |
| 2022/0353847 A1 | 11/2022 | Kim et al. | |
| 2022/0408501 A1 | 12/2022 | Yoshikawa | |
| 2023/0011167 A1* | 1/2023 | Chitrakar | H04L 1/1635 |
| 2023/0083503 A1* | 3/2023 | Han | H04W 74/0816 370/328 |
| 2023/0121480 A1* | 4/2023 | Guo | H04W 74/085 370/329 |
| 2023/0137441 A1 | 5/2023 | Yoshikawa | |
| 2023/0145827 A1* | 5/2023 | Gan | H04W 74/006 370/329 |
| 2023/0146138 A1* | 5/2023 | Asterjadhi | H04W 52/0219 370/311 |
| 2023/0156606 A1* | 5/2023 | Kim | H04W 84/12 370/329 |
| 2023/0209600 A1* | 6/2023 | Guo | H04W 76/15 370/329 |
| 2023/0254740 A1* | 8/2023 | Sedin | H04W 36/18 370/331 |
| 2023/0262760 A1* | 8/2023 | Wu | H04W 74/0808 370/338 |
| 2023/0300925 A1 | 9/2023 | Wu | |
| 2023/0319550 A1* | 10/2023 | Patwardhan | H04W 12/03 380/270 |
| 2023/0319821 A1 | 10/2023 | Dong | |
| 2024/0284501 A1* | 8/2024 | Cariou | H04W 74/002 |
| 2024/0407036 A1* | 12/2024 | Asterjadhi | H04W 52/0241 |
| 2025/0240818 A1* | 7/2025 | Gan | H04W 56/0005 |

FOREIGN PATENT DOCUMENTS

| | | |
|---|---|---|
| CN | 108400858 A | 8/2018 |
| CN | 108541047 A | 9/2018 |
| CN | 109219154 A | 1/2019 |
| EP | 4290902 A1 | 12/2023 |
| JP | 2014529276 A | 10/2014 |
| WO | 2007010131 A2 | 1/2007 |
| WO | 2010072624 A1 | 7/2010 |
| WO | 2019139789 A1 | 7/2019 |
| WO | 2019169101 A1 | 9/2019 |

OTHER PUBLICATIONS

"IEEE Standard for Information technology-Telecommunications and information exchange between systems Local and metropolitan area networks-Specific requirements, Part 11: Wireless LAN Medium Access Control (MAC) and Physical Layer (PHY) Specifications Amendment 2: Sub 1 GHz License Exempt Operation," IEE Std 802.11ah-2016, Total 594 pages (Approved Dec. 7, 2016).
"IEEE P802.11ax/D2.2, Draft Standard for Information technology-Telecommunications and information exchange between systems Local and metropolitan area networks-Specific requirements, Part 11: Wireless LAN Medium Access Control (MAC) and Physical Layer (PHY) Specifications, Amendment 6: Enhancements for High Efficiency WLAN," Total 620 pages (Feb. 2018).
JP/2022526166, Office Action, Apr. 11, 2023.
CN/202310450683.X, Notice of Allowance, Jan. 25, 2024.
U.S. Appl. No. 18/340,018, filed Jun. 22, 2023.
Gan et al., "BSS parameters update notification," IEEE 802.11-17/1368r0, Total 7 pages (Sep. 10, 2017).
Gan et al., "BSS parameters update notification," IEEE 802.11-17/1368r2, Total 8 pages (Sep. 10, 2017).
Min et al., "Multi-link power save operation," IEEE 802.11-19/1544r0, total 16 pages (Sep. 9, 2019).
Chitrakar et al. "Multi-link transmission," IEEE 802.11-19/1128r0, total 9 pages (Jul. 12, 2019).
Chitrakar et al. "Multi-link acknowledgment," IEEE 802.11-19/1512r1, total 15 pages (Sep. 10, 2019).
Chu et al., "Multi-Link Power Save," Marvell, IEEE 802.11-19/1617R0, total 8 pages (Sep. 2019).
Kim et al., "EHT Power saving considering multi-link," LG Electronics, IEEE 802.

* cited by examiner

COMMUNICATION METHOD BETWEEN MULTI-LINK DEVICES AND APPARATUS

CROSS-REFERENCE TO RELATED APPLICATIONS

This application is a continuation of International Application No. PCT/CN2020/127299, filed on Nov. 6, 2020, which claims priority to Chinese Patent Application No. 201911089950.5, filed on Nov. 8, 2019 and Chinese Patent Application No. 202010172040.X, filed on Mar. 12, 2020. All of the aforementioned applications are hereby incorporated by reference in their entireties.

TECHNICAL FIELD

Embodiments of this application relate to the field of communications technologies, and in particular, to a communication method between multi-link devices and an apparatus.

BACKGROUND

According to the current IEEE 802.11 next-generation wireless fidelity (Wi-Fi) protocol, an extremely high throughput (EHT) device supports multiple streams, multiple frequency bands (such as 2.4 GHz, 5 GHz, and 6 GHz frequency bands), cooperation of multiple channels in a same frequency band, and other manners, to improve a peak throughput and reduce traffic transmission latency. The multiple frequency bands or multiple channels may be collectively referred to as multi-link.

A multi-link operation greatly increases a rate of a station, but more power is required because multiple links need to operate at the same time. Therefore, during improvement of the rate of the station, how to reduce power consumption of a station multi-link device needs to be considered.

SUMMARY

Embodiments of this application provide a communication method between multi-link devices and an apparatus, and there is no need for each station in a station multi-link device to receive information indicating whether a downlink traffic exists on a respective link. This reduces power consumption of the station multi-link device.

To achieve the foregoing objective, the following technical solutions are used in the embodiments of this application.

According to a first aspect of the embodiments of this application, a communication method between multi-link devices is provided and applied to a first station (STA). The first STA includes a plurality of second STAs, and one second STA operates on one of a plurality of links. The method includes: The first STA determines a primary link, where the plurality of links include the primary link. A second STA operating on the primary link in the first STA receives downlink traffic indication information sent by a first access point AP. The downlink traffic indication information includes at least one of information used to indicate whether the second STA operating on the primary link has a downlink traffic or information used to indicate whether a second STA operating on a secondary link has a downlink traffic. The secondary link includes a link other than the primary link in the plurality of links. According to this solution, downlink traffic information of the primary link and/or downlink traffic information of the secondary link are/is sent over the primary link, so that the second STA operating on the primary link can determine whether there is a downlink traffic on the primary link, and may also determine whether there is a downlink traffic on the secondary link. Therefore, all second STAs included in the STA multi-link device do not need to receive downlink traffic indications on respective links. It may be understood that, According to this solution, the second STA operating on the primary link may obtain, on only the primary link, downlink traffic information of the second STA operating on the primary link, and also downlink traffic information of the second STA operating on the secondary link. Therefore, the second STA operating on the secondary link may not receive, on the secondary link on which the second STA operates, information indicating whether there is a downlink traffic on the secondary link. In other words, when no data is transmitted, the second STA operating on the secondary link may enter a doze state, to reduce power consumption of the station multi-link device.

With reference to the first aspect, in a first possible implementation, the downlink traffic is a downlink unicast traffic or a downlink multicast traffic. The method further includes: When the second STA operating on the primary link determines, based on the downlink traffic indication information, that the second STA operating on the secondary link has a downlink unicast traffic, the second STA operating on the secondary link sends a first frame to the first AP, where the first frame is used to indicate that the second STA operating on the secondary link is in an awake state. Alternatively, when the second STA operating on the primary link determines, based on the downlink traffic indication information, that the second STA operating on the secondary link has a downlink multicast traffic, the second STA operating on the secondary link receives the downlink multicast traffic from the first AP. According to this solution, when the second STA operating on the primary link determines that the second STA operating on the secondary link has a unicast traffic to be transmitted on the secondary link, the second STA operating on the secondary link enters an awake state, and sends a PS-Poll frame or a multi-link PS-Poll frame to the first AP, to notify the first AP that the second STA is in an awake state, so as to receive downlink traffic data from the first AP. When the second STA operating on the primary link determines that the second STA operating on the secondary link has a downlink multicast traffic, the second STA operating on the secondary link receives the downlink multicast traffic from the first AP. It may be understood that, because the downlink traffic information of the primary link and/or the downlink traffic information of the secondary link are/is sent over the primary link, the second STA operating on the primary link may determine whether the second STA operating on the secondary link has a downlink unicast traffic or a downlink multicast traffic. The second STA operating on the secondary link may not receive, on the secondary link on which the second STA operates, information indicating whether there is a downlink traffic on the secondary link. Therefore, when no data is transmitted, the second STA operating on the secondary link may enter a doze state, thereby reducing power consumption.

With reference to the first aspect and the foregoing possible implementations, in another possible implementation, the downlink traffic is a downlink multicast traffic. The method further includes: When the second STA operating on the primary link determines, based on the downlink traffic indication information, that the second STA operating on the secondary link has a downlink multicast traffic, the second STA operating on the primary link receives the downlink multicast traffic from the first AP. Alternatively, when the second STA operating on the primary link determines, based on the downlink traffic indication information, that the second STA operating on the primary link has a downlink multicast traffic, the second STA operating on the primary link receives the downlink multicast traffic from the first AP. According to this solution, when the second STA operating on the primary link determines that the second STA or the second STA operating on the secondary link has a downlink multicast traffic transmitted on the primary link, the second STA operating on the primary link may receive the downlink multicast traffic. It may be understood that, in this solution, when the first AP transmits, over the primary link, the downlink multicast traffic to the second STA operating on the secondary link, the second STA operating on the secondary link may always be in a doze state. After the second STA operating on the primary link receives the downlink multicast traffic transmitted by the first AP on the primary link, the second STA operating on the primary link transmits the traffic to the second STA operating on the secondary link. Therefore, power consumption of the station multi-link device can be reduced.

With reference to the first aspect and the foregoing possible implementations, in another possible implementation, the method further includes: The first STA sends an association request frame to the first AP, where the association request frame carries at least one of a quantity of second STAs to which association identifiers AIDs are to be allocated or identifier information of a link on which the second STA to which an AID is to be allocated operates. The first STA receives an association response frame from the first AP, where the association response frame carries an AID allocated to the second STA to which the AID is to be allocated, where one AID is allocated to the second STA operating on the primary link, and one or two AIDs are allocated to the second STA operating on the secondary link. According to this solution, the association request frame may be used to request the first AP to allocate an AID to the second STA (all or some of the second STAs included in the first STA) to which the AID is to be allocated. It may be understood that, in this solution, the first AP may allocate one AID to the second STA operating on the primary link, and allocate one or two AIDs to the second STA operating on the secondary link. It should be noted that AIDs of a plurality of second STAs in one BSS are different from each other. The second STA to which the AID is to be allocated may be all second STAs included in the first STA, or may be some of the second STAs included in the first STA.

With reference to the first aspect and the foregoing possible implementations, in another possible implementation, a link over which the first STA sends the association request frame to the first AP is the primary link, or the association request frame further carries identifier information of the primary link. According to this solution, when the first STA is not associated with the first AP, the association request frame may be sent to the first AP over the primary link determined by the first STA, and the association request frame may carry the identifier information of the primary link determined by the first STA, to notify the first AP of the primary link determined by the first STA.

With reference to the first aspect and the foregoing possible implementations, in another possible implementation, the method further includes: The first STA sends a management frame to the first AP, where the management frame carries the identifier information of the primary link. According to this solution, when the first STA and the first AP are already associated, the first AP may be notified, by using the management frame, the primary link determined by the first STA. It may be understood that, in this implementation, the primary link that is notified to the first AP by using the management frame is a new primary link determined by the first STA, that is, the identifier information of the primary link carried in the management frame is the identifier information of the new primary link.

With reference to the first aspect and the foregoing possible implementations, in another possible implementation, the downlink traffic indication information is carried in a TIM element field in a beacon frame or a traffic indication map TIM frame, the TIM frame further includes at least one of a field indicating identifier information of a link, a beacon check field, or a field indicating a quantity of links, and the beacon check field is used to indicate whether a key parameter is updated for a link indicated by the identifier information of the link. According to this solution, the downlink traffic indication information may be carried in a beacon frame or a TIM frame (a multi-link TIM frame). It may be understood that, when the downlink traffic indication information is carried in the beacon frame, each second STA has a corresponding AID. This helps determine, based on a TIM element in the beacon frame, which second STA has the downlink traffic. When the downlink traffic indication information is carried in the multi-link TIM frame, because the multi-link TIM frame includes the field indicating the identifier information of a link, a specific link that has a downlink traffic may be determined based on the TIM element and the identifier information of the link.

With reference to the first aspect and the foregoing possible implementations, in another possible implementation, the identifier information includes one or more pieces of the following information: an operating class corresponding to the link, a channel number corresponding to the link, a media access control MAC address of the link (or a basic service set identifier (BSS identifier, BSSID)), or an identifier of the link. According to this solution, the identifier information of the link may be indicated by one or more pieces of information such as the operating class and the channel number corresponding to the link, the media access control MAC address (or the BSSID) of the link, or the identifier of the link.

With reference to the first aspect and the foregoing possible implementations, in another possible implementation, the method further includes: The first STA receives candidate link set information from the first AP, where the candidate link set information includes identifier information of one or more candidate links. Correspondingly, that the first STA determines the primary link includes: The first STA determines the primary link from the one or more candidate links based on the candidate link set information. According to this solution, the first STA may determine the primary link from the one or more candidate links by receiving the candidate link set information from the first AP.

With reference to the first aspect and the foregoing possible implementations, in another possible implementation, the one or more candidate links belong to one basic service set BSS, each candidate link belongs to one BSS, and a part of the one or more candidate links belongs to one BSS. An AID allocated to one second STA in one BSS is unique. According to this solution, the first AP may establish one BSS for all candidate links in a candidate link set, or may establish one BSS for each candidate link in the candidate link set, or may establish one BSS for some candidate links in the candidate link set. It should be noted that when the first AP allocates an AID to the second STA, an AID allocated to one second STA in one BSS is unique.

According to a second aspect of the embodiments of this application, a communication method between multi-link devices is provided. The method includes: A first access point AP obtains identifier information of a primary link determined by a first station STA. The first STA includes a plurality of second STAs, one second STA operates on one of a plurality of links, and the plurality of links include the primary link. The first AP sends downlink traffic indication information to a second station STA operating on the primary link in the first STA. The downlink traffic indication information includes at least one of information used to indicate whether the second STA operating on the primary link has a downlink traffic or information used to indicate whether a second STA operating on a secondary link has a downlink traffic. The secondary link includes a link other than the primary link in the plurality of links. According to this solution, the first AP may obtain the identifier information of the primary link determined by the first STA, and send the downlink traffic indication information to the second STA operating on the primary link. It may be understood that the downlink traffic indication information sent by the first AP to the second STA operating on the primary link includes the information indicating whether there is a downlink traffic on the primary link, and the information indicating whether there is a downlink traffic on the secondary link. Therefore, downlink traffic information of the primary link and/or downlink traffic information of the secondary link are/is sent over the primary link, so that the second STA operating on the primary link can determine whether there is a downlink traffic on the primary link, and determine whether there is a downlink traffic on the secondary link. Therefore, all second STAs included in a STA multi-link device do not need to receive downlink traffic indications on respective links. Optionally, the second STA operating on the secondary link may not receive, on the secondary link on which the second STA operates, information indicating whether there is a downlink traffic on the secondary link. In other words, when no data is transmitted, the second STA operating on the secondary link may enter a doze state. This reduces power consumption of a station multi-link device.

According to a third aspect of the embodiments of this application, a communications apparatus is provided and applied to a first station STA. The first STA includes a plurality of second STAs, and one second STA operates on one of a plurality of links. The first STA includes: a processing unit, configured to determine a primary link, where the plurality of links include the primary link; and a transceiver unit, configured to receive downlink traffic indication information sent by a first access point AP. The downlink traffic indication information includes at least one of information used to indicate whether a second STA operating on the primary link has a downlink traffic or information used to indicate whether a second STA operating on a secondary link has a downlink traffic; and the secondary link includes a link other than the primary link in the plurality of links.

According to a fourth aspect of the embodiments of this application, a communications apparatus is provided. The apparatus includes: a processing unit, configured to obtain identifier information of a primary link determined by a first station STA, where the first STA includes a plurality of second STAs, one second STA operates on one of a plurality of links, and the plurality of links include the primary link; and a transceiver unit, configured to send downlink traffic indication information to a second station STA operating on the primary link in the first STA. The downlink traffic indication information includes at least one of information used to indicate whether a second STA operating on the primary link has a downlink traffic or information used to indicate whether a second STA operating on a secondary link has a downlink traffic, and the secondary link includes a link other than the primary link in the plurality of links.

For effect descriptions of the third aspect and various implementations of the third aspect, refer to the corresponding effect descriptions of the first aspect and various implementations of the first aspect. For effect descriptions of the fourth aspect and various implementations of the fourth aspect, refer to the corresponding effect descriptions of the second aspect and various implementations of the second aspect. Details are not described herein again.

The communications apparatus in the third aspect or the fourth aspect may be a chip, the processing unit may be a processing circuit of the chip, the transceiver unit may be an input/output interface circuit, the processing circuit may be configured to process signaling or data information provided by the input/output interface circuit, and the input/output interface circuit may be configured to input/output data or signaling information for the chip.

According to a fifth aspect of the embodiments of this application, a computer-readable storage medium is provided, where the computer-readable storage medium stores computer program code. When the computer program code is run on a processor, the processor is enabled to perform the communication method between multi-link devices according to any one of the foregoing aspects.

According to a sixth aspect of the embodiments of this application, a computer program product is provided. The program product stores computer software instructions executed by the foregoing processor. The computer software instructions include a program used to perform the solutions according to the foregoing aspects.

According to a seventh aspect of the embodiments of this application, a communications apparatus is provided. The apparatus includes a processor, and may further include a transceiver and a memory. The transceiver is configured to send and receive information, or configured to communicate with another network element. The memory is configured to store computer-executable instructions. The processor is configured to execute the computer-executable instructions, to support the communications apparatus in implementing the method according to any one of the foregoing aspects.

According to an eighth aspect of the embodiments of this application, a communications apparatus is provided. The apparatus may exist in a product form of a chip. A structure of the apparatus includes a processor, and may further include a memory. The memory is configured to be coupled to the processor to store program instructions and data that are necessary for the apparatus. The processor is configured to execute the program instructions stored in the memory, to support the communications apparatus in performing the method according to any one of the foregoing aspects.

According to a ninth aspect of the embodiments of this application, a communications apparatus is provided. The apparatus may exist in a product form of a chip. A structure of the apparatus includes a processor and an interface circuit. The processor is configured to communicate with another apparatus through a receiving circuit, so that the apparatus performs the method according to any one of the foregoing aspects.

DESCRIPTION OF EMBODIMENTS

Figure 1:
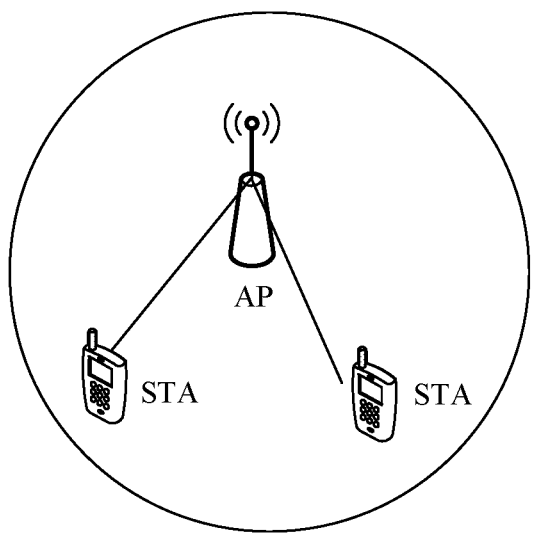
FIG. 1 is a schematic diagram of a structure of a communications system according to an embodiment of this application.

The following describes the technical solutions in embodiments of this application with reference to the accompanying drawings in the embodiments of this application. In this application, "at least one" means one or more, and "a plurality of" means two or more. "And/or" describes an association relationship between associated objects, and represents that three relationships may exist. For example, A and/or B may represent the following cases: A exists alone, both A and B exist, and B exists alone, where A and B may be singular or plural. The character "/" usually indicates an "or" relationship between the associated objects. "At least one of the following items (pieces)" or a similar expression thereof means any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural.

It should be noted that, in this application, terms such as "example" or "for example" are used to represent giving an example, an illustration, or descriptions. Any embodiment or design described as an "example" or "for example" in this application should not be explained as being more preferred or having more advantages than another embodiment or design. Exactly, use of the terms such as "example" or "for example" is intended to present a related concept in a specific manner.

Descriptions related to "first", "second" and the like in the embodiments of this application are merely used for indicating and distinguishing between described objects, do not show a sequence, do not indicate a specific limitation on a quantity of devices in the embodiments of this application, and do not constitute any limitation on the embodiments of this application.

In the embodiments of this application, "connection" means various connection manners such as a direct connection or an indirect connection, for implementing communication between devices. This is not limited in the embodiments of this application.

Unless otherwise specified, "transmission" (transmit/transmission) in the embodiments of this application refers to bidirectional transmission, and includes a sending action and/or a receiving action. Specifically, "transmission" in the embodiments of this application includes data sending, data receiving, or data sending and receiving. In other words, data transmission herein includes uplink data transmission and/or downlink data transmission. Data may include a channel and/or a signal. Uplink data transmission is uplink channel transmission and/or uplink signal transmission, and downlink data transmission is downlink channel transmission and/or downlink signal transmission.

In the embodiments of this application, a "network" and a "system" express a same concept, and a communications system is a communication network.

An embodiment of this application provides a communication method between multi-link devices. The method is applied to a wireless communications system. The wireless communications system may be a wireless local area network. The wireless local area network includes at least one access point (AP) and at least one station (STA). The AP is a network element that provides a traffic for a station, for example, an access point that can support an 802.11 protocol family. The station STA may be a station that supports the 802.11 protocol family, for example, an extremely high throughput (EHT) station, or a station that supports IEEE 802.11be.

For example, as shown in FIG. 1, the communication method provided in the embodiments of this application may be applied to a communications system shown in FIG. 1. In the communications system, one access point AP may perform data transmission with a plurality of STAs. For example, the AP in FIG. 1 may transmit uplink data or downlink data with two STAs.

Currently, an IEEE 802.11 next-generation Wi-Fi protocol device can support multiple streams, multiple frequency bands (such as 2.4 GHz, 5 GHz, and 6 GHz frequency bands), cooperation of multiple channels in a same frequency band, and other manners, to improve a peak throughput and reduce traffic transmission latency. In other words, the STA in the communications system shown in FIG. 1 may transmit uplink or downlink data in a multi-band or multi-channel manner. In other words, the STA may transmit uplink or downlink data over a plurality of links, and the STA that communicates uplink or downlink data over a plurality of links may be referred to as a STA multi-link device. For example, the STA in the communications system shown in FIG. 1 may be a STA multi-link device, and the AP in the communications system shown in FIG. 1 may be an AP multi-link device, namely, an AP that communicates uplink or downlink data over a plurality of links. The STA multi-link device may include one or more STAs, and the one or more STAs operate on a plurality of links. The AP multi-link device includes one or more APs, and the one or more APs operate on a plurality of links.

Figure 2:
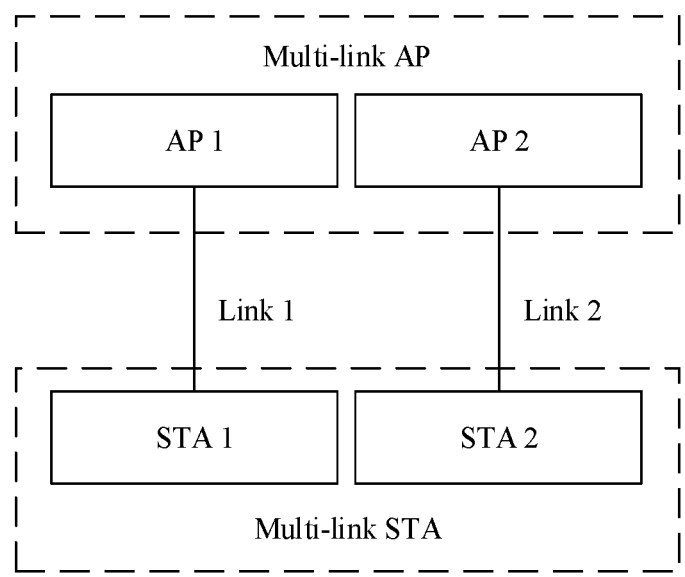
FIG. 2 is a schematic diagram of communication between multi-link devices according to an embodiment of this application.

For example, FIG. 2 is a schematic diagram of communication between multi-link devices, for example, may be a schematic diagram of communication between the AP multi-link device and the STA multi-link device in the communications system shown in FIG. 1. As shown in FIG. 2, the STA multi-link device may communicate with the AP multi-link device over two links. The STA multi-link device includes a STA 1 and a STA 2, and the AP multi-link device includes an AP 1 and an AP 2. The STA 1 in the STA multi-link device may communicate with the AP 1 in the AP multi-link device over a link 1, and the STA 2 in the STA multi-link device may communicate with the AP 2 in the AP multi-link device over a link 2. In other words, the STA multi-link device may transmit data to the AP multi-link device over a plurality of links, and one STA in a plurality of STAs included in the STA multi-link device operates on one of the plurality of links.

Figure 3:
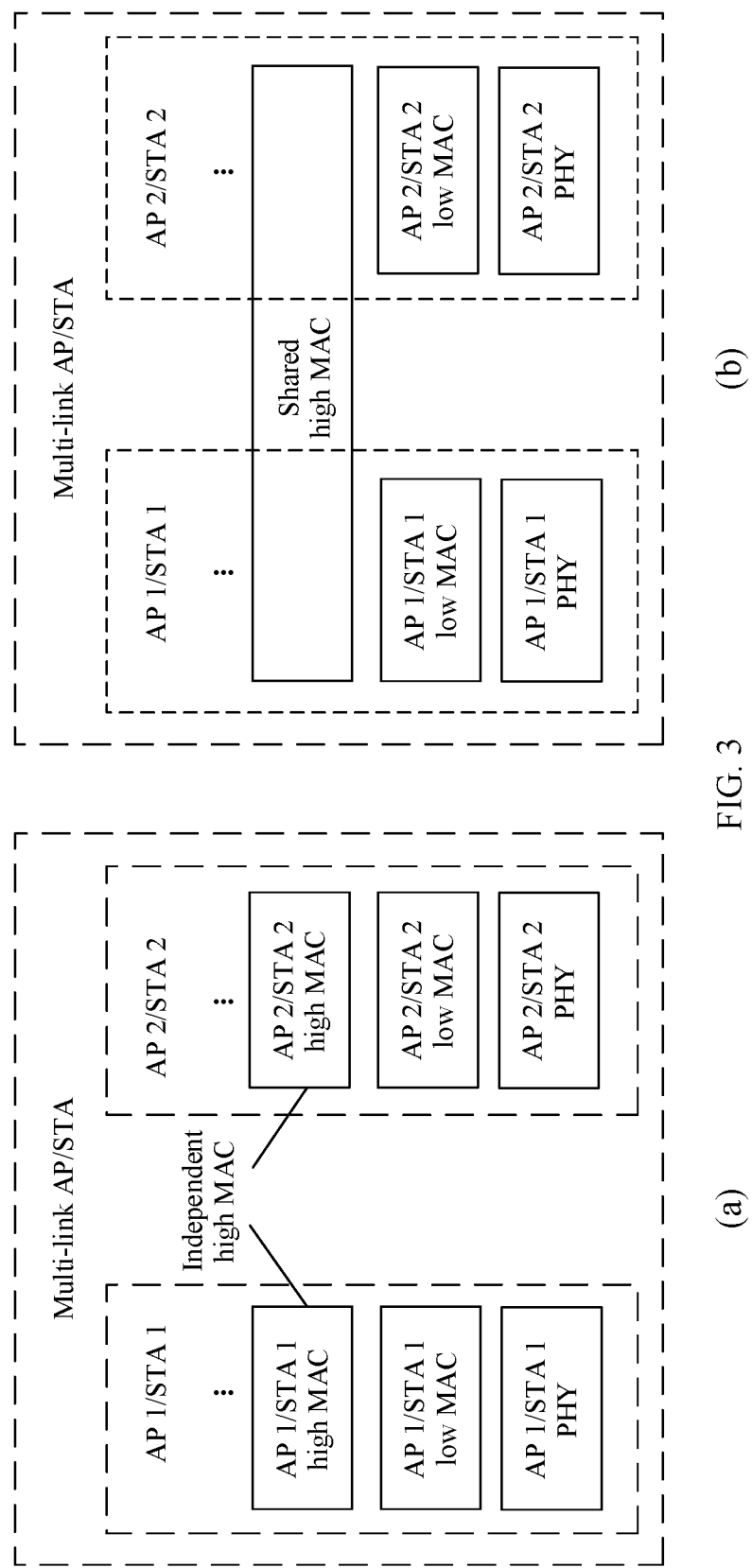
FIG. 3 including (a) and (b) is a schematic diagram of a structure of a multi-link device according to an embodiment of this application.

For example, FIG. 3 is a schematic diagram of a structure of a multi-link device. The 802.11 standard focuses on an 802.11 physical layer (PHY) and an 802.11 media access control (MAC) layer in the multi-link device. As shown in (a) in FIG. 3, a plurality of STAs (or a plurality of APs) included in a STA multi-link device (or a AP multi-link device) are independent of each other at both a low MAC (Low MAC) layer and a low PHY layer, and are also independent of each other at a high MAC (High MAC) layer. As shown in (b) in FIG. 3, the plurality of STAs (or the plurality of APs) included in the STA multi-link device (or the AP multi-link device) are independent of each other at both the low MAC (Low MAC) layer and the low PHY layer, and share the high MAC layer. Certainly, in a multi-link communication process, the STA multi-link device may use a structure in which STAs are independent of each other at the high MAC layer, and the AP multi-link device uses a structure in which APs share the high MAC layer. Alternatively, the STA multi-link device may use a structure in which STAs share the high MAC layer, and the AP multi-link device use a structure in which APs are independent of each other at the high MAC layer. Alternatively, the STA multi-link device may use a structure in which STAs share the high MAC layer, and the AP multi-link device may also use a structure in which APs share the high MAC layer. Alternatively, the STA multi-link device may use a structure in which STAs are independent of each other at the high MAC layer, and the AP multi-link device may also use a structure in which APs are independent of each other at the high MAC layer. A schematic diagram of an internal structure of the multi-link device is not limited in this embodiment of this application. FIG. 3 is merely an example for description.

For example, the STA multi-link device and the AP multi-link device in this embodiment of this application may be a single-antenna device, or may be a multi-antenna device. For example, the device may be a device with more than two antennas. A quantity of antennas included in the multi-link device is not limited in this embodiment of this application. In this embodiment of this application, the STA multi-link device and the AP multi-link device may allow traffic of a same access type to be transmitted on different links, or even allow a same data packet to be transmitted on different links. Alternatively, traffic of the same access type may not be allowed to be transmitted on different links, but traffic of different access types may be allowed to be transmitted on different links.

For example, the multi-link device in this embodiment of this application, for example, a station multi-link device device or another AP multi-link device device, includes one or more stations in a logical sense, where each station operates on one link, the one or more stations are allowed to operate on a same link, and a link on which the station operates may be changed. A link identifier in this embodiment of this application is used to identify a link, a BSS, an AP in the AP multi-link device device, or a STA in a station multi-link device device, and represents one or a combination of an operating class in which the link is located, a channel number, and a MAC address.

For example, the STA multi-link device in this embodiment of this application may be an apparatus that supports the 802.11 protocol family and has a wireless transceiver function. For example, the STA multi-link device may be a web-connected user equipment, for example, a tablet computer, a desktop computer, a laptop computer, a notebook computer, an ultra-mobile personal computer (UMPC), a handheld computer, a netbook, a personal digital assistant (PDA), or a mobile phone; an internet of things node in the Internet of things; or the like. The AP multi-link device in this embodiment of this application may be an apparatus that supports the 802.11 protocol family and provides traffic for the STA multi-link device. For example, the AP multi-link device may be a communications entity, for example, a communications server, a router, a switch, or a bridge. Alternatively, the AP multi-link device may include various forms of macro base stations, micro base stations, relay stations, and the like. Specific forms of the STA multi-link device and the AP multi-link device are not specifically limited in this embodiment of this application, and are merely examples for description herein. The 802.11 protocol may be a protocol that supports 802.11be or is compatible with 802.11be.

Figure 4:
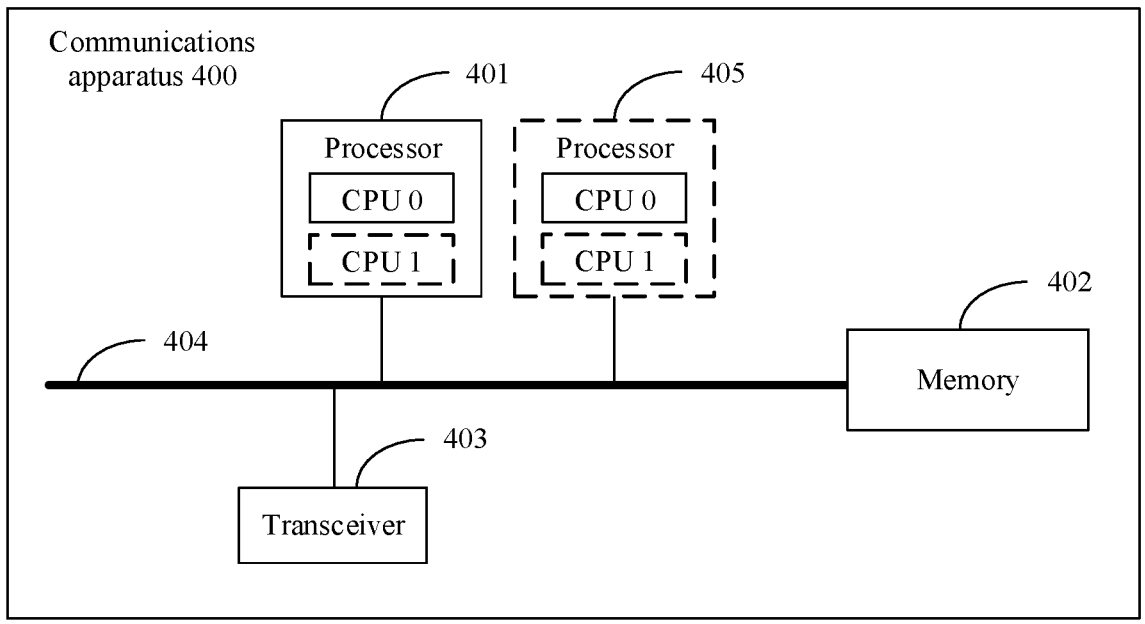
FIG. 4 is a schematic diagram of composition of a communications apparatus according to an embodiment of this application.

During specific implementation, the devices shown in FIG. 1 to FIG. 3 (for example, the AP, the STA, the STA multi-link device, and the AP multi-link device) may use the component structure shown in FIG. 4, or may include the components shown in FIG. 4.

For example, FIG. 4 is a schematic diagram of composition of a communications apparatus 400 according to an embodiment of this application. As shown in FIG. 4, the communications apparatus 400 may include at least one processor 401, a memory 402, a transceiver 403, and a communications bus 404.

The following specifically describes the components of the communications apparatus 400 with reference to FIG. 4.

The processor 401 is a control center of the communications apparatus 400, and may be one processor or may be a collective term of a plurality of processing elements. For example, the processor 401 is a central processing unit (CPU), an application-specific integrated circuit (ASIC), or one or more integrated circuits configured to implement this embodiment of this application, for example, one or more microprocessors (DSP), or one or more field programmable gate arrays (FPGA).

The processor 401 may execute various functions of the communications apparatus 400 by running or executing a software program stored in the memory 402 and invoking data stored in the memory 402.

During specific implementation, in an embodiment, the processor 401 may include one or more CPUs, for example, a CPU 0 and a CPU 1 shown in FIG. 4.

During specific implementation, in an embodiment, the communications apparatus 400 may include a plurality of processors, for example, the processor 401 and a processor 405 shown in FIG. 4. Each of the processors may be a single-CPU processor or may be a multi-CPU processor. The processor herein may be one or more communication devices, circuits, and/or processing cores configured to process data (for example, computer program instructions).

The memory 402 may be a read-only memory (ROM) or another type of static storage communications device that can store static information and instructions; or a random access memory (RAM) or another type of dynamic storage communications device that can store information and instructions. The memory 402 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communications device, or any other medium that can be used to carry or store expected program code in a form of instructions or a data structure and that is accessible by a computer, but is not limited thereto. The memory 402 may exist independently, and is connected to the processor 401 through the communications bus 404. The memory 402 may alternatively be integrated with the processor 401. The memory 402 is configured to store a software program for executing the solutions of this application, and the processor 401 controls execution of the software program.

The transceiver 403 is configured to communicate with another device (for example, an access point or a station). Certainly, the transceiver 403 may be further configured to communicate with a communications network, for example, the Ethernet, a radio access network (RAN), or a wireless local area network (WLAN). The transceiver 403 may include a receiving unit for implementing a receiving function and a sending unit for implementing a sending function. In this embodiment of this application, when the communications apparatus 400 is a multi-link device, the transceiver 403 may send and receive data transmitted on a primary link in the multi-link device, or may send and receive data transmitted on a secondary link in the multi-link device. Optionally, the transceiver 403 may further include a plurality of transceiver modules. One transceiver module is configured to send and receive data transmitted on the primary link in the multi-link device, and another transceiver module is configured to send and receive data transmitted on the secondary link in the multi-link device.

The communications bus 404 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

Generally, a power-saving technology based on a traffic indication map (TIM), wireless network management (WNM), a target wake up time (TWT), or automatic power save delivery (APSD) may be used to reduce power consumption of a single-link STA. This embodiment of this application is mainly described by using a TIM-based power-saving technology as an example.

In the 802.11 protocol, a STA generally has two operating modes: a non-power-saving mode and a power-saving mode. When the STA operates in the non-power-saving mode, the STA is in an active state (which may also be referred to as an awake state) regardless of whether there is to-be-transmitted data on the STA. When the STA operates in the power-saving mode, the STA may be in an active state when transmitting data with an AP. When there is no data transmission between the STA and the AP, the STA may be in a doze state to reduce power consumption. The STA may send a frame to the AP to notify whether the STA is in the power-saving mode, where a power-saving bit of 1 in a frame control field in a MAC header in the frame is used to notify that the STA is in the power-saving mode, while a power-saving bit of 0 in the frame control field in the MAC header in the frame is used to notify that the STA is in the non-power-saving mode.

To reduce power consumption of the STA, the AP may buffer a downlink traffic of the STA, and send the downlink traffic to the STA after the STA wakes up. However, because buffer space of the AP is limited, the AP periodically sends an 802.11 beacon frame carrying a TIM element to notify a STA associated with the AP of whether there is a downlink traffic to be received. The STA operating in the power-saving mode periodically wakes up to receive the beacon frame from the AP and determines whether the AP transmits a downlink traffic of the STA. If the AP transmits no downlink traffic of the STA, the STA may switch to the doze state. If the AP transmits a downlink traffic of the STA, the STA may select a time point to wake up and send a power saving polling frame (PS-polling frame) to the AP, to notify the AP that the STA is in the active state. The time point may be the same as or different from a time point for receiving the beacon frame.

For example, the 802.11 beacon frame (beacon) may be classified into two types: a traffic indication map (TIM) beacon frame, and a delivery traffic indication map (DTIM) beacon frame. Compared with the TIM beacon frame, the DTIM beacon frame indicates not only buffered unicast information, but also multicast information buffered by the AP. Each beacon frame (beacon) includes a TIM element field, and the TIM element field is used to indicate a STA that is managed by the AP and whose downlink data is buffered in the AP. A frame format of the TIM element field is shown in the following Table 1.

TABLE 1

| Element ID (1 byte) | Length (1 byte) | DTIM count (1 byte) | DTIM period (1 byte) | Bitmap control (1 byte) | Partial virtual bitmap (1 to 251 bytes) |
|---|---|---|---|---|---|

As shown in Table 1, an element ID (identifier) field is used to identify that the element is a TIM element. A length field is used to indicate a length of the TIM element. A DTIM period field indicates a period for receiving the DTIM beacon frame, which is also referred to as an arrival interval and expressed in beacon frame period. A DTIM count field is used to indicate a quantity of TIM beacon frames by the time that a next DTIM beacon frame arrives. The DTIM count field is a variable count value. When a value of the DTIM count field is 0, it indicates that the beacon frame is a DTIM beacon frame; otherwise, the beacon frame is a TIM beacon frame, that is, when the value of the DTIM count field is not 0, it indicates that the beacon frame is a TIM beacon frame. For example, if the DTIM period field is set to 1, the DTIM count field in each TIM element field is equal to 0. Therefore, each beacon frame is a DTIM beacon frame.

A first bit (bit 0) in a bitmap control field in Table 1 indicates whether there is a downlink multicast traffic in the DTIM beacon frame sent by the AP. Bits 1 to 7 in the bitmap control field indicate an offset of the partial virtual bitmap. In other words, the offset is measured in bytes, that is, 8 bits. Each bit in a partial virtual bitmap field is mapped to one STA, and when a value of the bit is 1, it indicates that downlink data of a STA corresponding to the bit is buffered in the AP. For example, if the offset is 0, the partial virtual bitmap starts from an association identifier (AID) 1. If the offset is 1, the partial virtual bitmap starts from an AID 9. An end bit of the partial virtual bitmap is determined by the length field. Therefore, a maximum length of the partial virtual bitmap is 251 bytes, that is, 2008 bits.

For example, the length field is 4 bytes, and the bits 1 to 7 in the bitmap control field indicate that the offset of the partial virtual bitmap is 0. In this case, when the partial virtual bitmap field is 01100110, the TIM element field indicates that downlink data of STAs corresponding to an AID 2, an AID 3, an AID 6, and an AID 7 is buffered in the AP. For another example, the length field is 4 bytes, and the bits 1 to 7 in the bitmap control field indicate that the offset of the partial virtual bitmap is 1. In this case, when the partial virtual bitmap field is 01100110, the TIM element field indicates that downlink data of STAs corresponding to an AID 10, an AID 11, an AID 14, and an AID 15 is buffered in the AP.

For example, if the AP operates in a multiple basic service set identifier (BSSID) mode, the AP includes a basic service set (BSS) identified by a transmitted BSSID, and further includes a plurality of BSSs identified by nontransmitted BSSIDs. A maximum of $2^n$ BSSs are allowed in a multiple BSSID set, where n is a value indicated by a MaxBSSID indicator field in a multi BSSID element. In this case, bits 1 to $2^n - 1$ in the partial virtual bitmap field are used to indicate a downlink multicast traffic corresponding to the BSS identified by a nontransmitted BSSID. The bit $2^n$ indicates, based on an indication of the offset of the partial virtual bitmap, whether the STA corresponding to each AID has a downlink unicast traffic.

The 802.11-2016 protocol further optimizes a length of the partial virtual bitmaps, for example, a method A and a method B described in the 802.11-2016 protocol are used. A method C specified in the subsequent 802.11ah draft protocol may also be used. These methods are all applicable to the embodiments of this application.

The foregoing TIM-based power-saving technology can only reduce power consumption of a single-link STA, but not power consumption of a STA multi-link device. In view of this, an independent power-saving mechanism may be used on each link in an implementation, to reduce power consumption of the STA multi-link device to some extent. For example, the TIM-based power-saving technology is used on each link in the STA multi-link device. To be specific, each STA in the STA multi-link device receives a beacon frame on a corresponding link, that is wakes up at a time when the beacon frame is sent and enters a doze state at other time. However, in this method, the STA multi-link device still needs to continuously enable a plurality of STAs managed by the STA multi-link device, and therefore power consumption of the STA multi-link device is still relatively high. To avoid a problem that power consumption of the station multi-link device is relatively high because the station multi-link device needs to continuously enable the plurality of stations managed by the station multi-link device, the embodiments of this application provide a communication method between multi-link devices. According to the method, the station multi-link device does not need to periodically enable all the stations managed by the station multi-link device. This further reduces power consumption of the station multi-link device.

To resolve a problem that power consumption of a station multi-link device is relatively high because the station multi-link device needs to continuously enable a plurality of stations managed by the station multi-link device, an embodiment of this application provides a communication method between multi-link devices. The method is applied to a first station STA, the first STA includes one or more second STAs, and one second STA operates on one of a plurality of links. With reference to FIG. 1 to FIG. 4 and FIG. 5, the method includes steps S501 to S504, and some steps may not be performed.

S501: A first STA determines a primary link.

For example, the first STA is a STA multi-link device, the STA multi-link device may operate on a plurality of links, that is, the STA multi-link device may perform data transmission over the plurality of links, and frequency bands or channels of the plurality of links are different. The STA multi-link device may include one or more second STAs, and one second STA operates on one of the plurality of links. The plurality of links include the primary link.

For example, the one or more second STAs included in the first STA are independent of each other at both a low MAC layer and a physical layer, and may share a high MAC layer, or may be independent of each other. This is not limited in this embodiment of this application.

Figure 6:
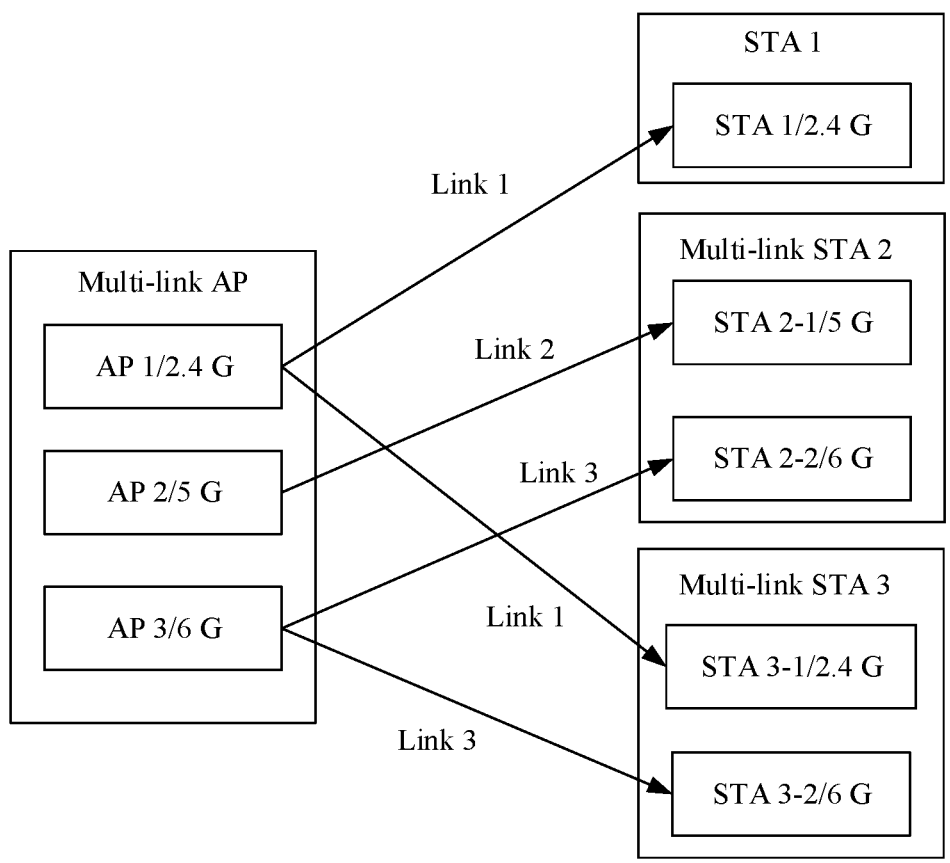
FIG. 6 is a schematic diagram of a scenario of a communication method between multi-link devices according to an embodiment of this application.

For example, FIG. 6 is a schematic diagram of communication between multi-link devices. As shown in FIG. 6, a AP multi-link device may communicate with a plurality of stations (a STA 1, a STA 2, and a STA 3) managed by the AP multi-link device, and the STA 2 and the STA 3 are STA multi-link devices. The STA 1 operates in a 2.4 GHz frequency band. The STA multi-link device 2 includes a STA 2-1 and a STA 2-2, where the STA 2-1 operates in a 5 GHz frequency band, and the STA 2-2 operates in a 6 GHz frequency band. The STA multi-link device 3 includes a STA 3-1 and a STA 3-2, where the STA 3-1 operates in the 2.4 GHz frequency band, and the STA 3-2 operates in the 6 GHz frequency band. An AP 1 operating in the 2.4 GHz frequency band in the AP multi-link device may transmit uplink or downlink data with the STA operating in the 2.4 GHz frequency band over a link 1. An AP 2 operating in the 5 GHz frequency band in the AP multi-link device may transmit uplink or downlink data with the STA operating in the 5 GHz frequency band in the STA multi-link device over a link 2. An AP 3 operating in the 6 GHz frequency band in the AP multi-link device may transmit uplink or downlink data with the STA operating in the 6 GHz frequency band in the STA multi-link device over a link 3. For example, the AP 1 operating in the 2.4 GHz frequency band in the AP multi-link device in FIG. 6 may transmit uplink or downlink data with the STA 1 operating in the 2.4 GHz frequency band and the STA 3-1 operating in the 2.4 GHz frequency band in the STA multi-link device 3 over the link 1. The AP 2 operating in the 5 GHz frequency band in the AP multi-link device may transmit uplink or downlink data with the STA 2-1 operating in the 5 GHz frequency band in the STA multi-link device 2 over the link 2. The AP 3 operating in the 6 GHz frequency band in the AP multi-link device may transmit uplink or downlink data with the STA 2-2 operating in the 6 GHz frequency band in the STA multi-link device 2 and the STA 3-2 operating in the 6 GHz frequency band in the STA multi-link device 3 over the link 3.

It should be noted that, FIG. 6 is described by using an example in which the AP multi-link device supports three frequency bands, each frequency band corresponds to one link, and the AP multi-link device may operate on one or more links of the link 1, the link 2, or the link 3. On an AP side or a STA side, the link herein may be further understood as a station operating on the link. In actual application, the AP multi-link device may further support more or fewer frequency bands, that is, the AP multi-link device may operate on more or fewer links. This is not limited in this embodiment of this application.

For example, the STA multi-link device 2 in FIG. 6 is the first STA in step S501, and the first STA includes the STA 2-1 and the STA 2-2, and the first STA may operate on a plurality of links. As shown in FIG. 6, the STA 2-1 included in the first STA may operate on the link 2, and an operating frequency band of the link 2 is 5 GHz frequency band; the STA 2-2 included in the first STA may operate on the link 3, an operating frequency band of the link 3 is a 6 GHz frequency band, and the primary link determined by the first STA is the link 2 or the link 3.

For example, that the first STA determines the primary link may include: The first STA determines the primary link based on channel utilization information corresponding to the link, a signal quality parameter of the link, and/or the like. A specific method for determining the primary link by the first STA is not limited in this embodiment of this application, and is merely an example for description herein. In an example, the method for determining the primary link may be combined with the solution of steps S1401 to 1404 in FIG. 14.

Optionally, the first STA may include only one second STA, and a link on which the second STA operates may be changed and switched. For example, the second STA included in the first STA may operate on the 5 GHz frequency band in some scenarios, and may operate on the 6 GHz frequency band in other scenarios.

S502: The first AP obtains identifier information of the primary link determined by the first STA.

For example, the first AP may be the AP multi-link device, and may operate on a plurality of links. For example, the AP multi-link device shown in FIG. 6 may operate on one or more links of the link 1, the link 2, or the link 3.

For example, the identifier information of the primary link may include one or more of the following information: an operating class and a channel number that are corresponding to the primary link, a MAC address (or a BSSID) of the primary link, or an identifier (ID) of the primary link. Specific content included in the identifier information of the primary link is not limited in this embodiment of this application. Any information that can uniquely identify the primary link may be the identifier information of the primary link in this embodiment of this application. The MAC address of the primary link may be a MAC address of a STA operating on the primary link, or a MAC address of an AP operating on the primary link. When the MAC address of the primary link is the MAC address of the AP operating on the primary link, the MAC address of the primary link may also be referred to as a BSSID.

In an implementation, when the first AP is not associated with the first STA, that the first AP obtains the identifier information of the primary link may include: The first AP receives an association request frame from the first STA. A link over which the first AP receives the association request frame is the primary link determined by the first AP, or the association request frame received by the first AP carries the identifier information of the primary link determined by the first AP. In other words, the first AP may determine a link over which the association request frame is received as the primary link, and identifier information of the link is the identifier information of the primary link. Alternatively, the first AP obtains the identifier information of the primary link carried in the association request frame.

In another implementation, when the first AP and the first STA are already associated, that the first AP obtains the identifier information of the primary link may include: The first AP receives a management frame from the first STA, where the management frame carries the identifier information of the primary link determined by the first STA. It may be understood that, in this implementation, the management frame is used to notify the AP of a new primary link determined by the first STA, that is, the identifier information of the primary link carried in the management frame is the identifier information of the new primary link. Optionally, the management frame may further include a replacement count, which is used to indicate a countdown of primary link replacement.

A specific method for obtaining the identifier information of the primary link by the first AP is not limited in this embodiment of this application, and is merely an example for description herein. For example, the first AP may alternatively determine the primary link.

It should be noted that the primary link may alternatively be specified in a protocol. When the primary link is a link specified in the protocol, the foregoing steps S501 and S502 are optional steps. For example, the protocol may specify a link operating in a frequency band as the primary link.

S503: The first AP sends downlink traffic indication information to a second STA operating on the primary link in the first STA.

The downlink traffic indication information includes at least one of information used to indicate whether the second STA operating on the primary link has a downlink traffic, or information used to indicate whether a second STA operating on a secondary link has a downlink traffic. For example, the downlink traffic indication information includes the information used to indicate whether the second STA operating on the primary link has a downlink traffic; the downlink traffic indication information includes the information used to indicate whether the second STA operating on the secondary link has a downlink traffic; or the downlink traffic indication information includes the information used to indicate whether the second STA operating on the primary link has a downlink traffic and the information used to indicate whether the second STA operating on the secondary link has a downlink traffic.

The secondary link includes a link other than the primary link in the plurality of links. The downlink traffic includes a downlink unicast traffic and a downlink multicast traffic. There may be one or more secondary links on which the first STA operates.

For example, the secondary link may include some or all links in the plurality of links other than the primary link. For example, the first STA may operate on four links, and the four links are the link 1, the link 2, the link 3, and a link 4. If the primary link determined by the first STA is the link 2, the secondary link may include at least one of the link 1, the link 3, or the link 4. For example, the secondary link may include the link 1, the link 3, and the link 4. For another example, the secondary link may include the link 3 and the link 4.

For example, in step S503, the first AP may send, to the first STA (or the second STA operating on the primary link) on the primary link, the information indicating whether the second STA operating on the primary link has a downlink traffic; or send, to the first STA (or the second STA operating on the primary link) on the primary link, the information indicating whether the second STA operating on the secondary link has a downlink traffic. This is not limited in this embodiment of this application. For example, the second STA operating on the primary link periodically wakes up. The first AP may send the downlink traffic indication information to the first STA (or the second STA operating on the primary link) on the primary link. After entering an awake state, the second STA operating on the primary link may receive the downlink traffic indication information from the first AP. It should be noted that there may be one or more secondary links, there may be one or more second STAs operating on the secondary link, and there may also be one or more second STAs operating on the primary link. The case is also applicable to the following embodiments. Details are not described again in the following embodiments.

For example, the first AP may alternatively send the downlink traffic indication information on the secondary link. Specifically, the first AP may send the downlink traffic indication information to the first STA (or the second STA operating on the primary link) on the secondary link. For example, when the first AP learns that the second STA operating on the secondary link is in an awake state, the first AP may send the downlink traffic indication information to the first STA (or the second STA operating on the primary link) on the secondary link.

For example, the downlink traffic indication information may be carried in a TIM element field in a beacon frame or a TIM frame. Optionally, the downlink traffic indication information may be carried in another management frame. In other words, the TIM element field in this embodiment of this application may specifically comprise information used to indicate whether a second STA corresponding to each link has a downlink traffic.

In a first case, when a TIM element field in a beacon frame or another management frame carries the downlink traffic indication information, the following two implementations may be used to implement that the TIM element field comprises the information used to indicate whether the second STA corresponding to each link has a downlink traffic. The another management frame may comprise a TIM frame, a probe response frame, an association response frame, and the like.

In a first implementation, the beacon frame or the another management frame sent by the first AP on the primary link may include a plurality of TIM element fields, the plurality of TIM element fields correspond to a plurality of links, and one TIM element field includes downlink traffic indication information of a second STA operating on a link. Optionally, the TIM element field may further include identifier information of a link. After receiving the beacon frame or the another management frame sent by the first AP on the primary link, the first STA may learn whether a plurality of stations included in the first STA have a downlink traffic.

In a second implementation, a field included in an existing TIM element may not be changed, and each beacon frame or the another management frame includes one TIM element. One bit in a partial virtual bitmap in the TIM element correspondingly indicates whether one STA has a downlink traffic. For example, for each BSS, the first AP allocates an AID to each second STA in a STA multi-link device in the BSS, that is, the AID corresponds to a second STA operating on a link in the station multi-link device. For another example, the first AP allocates AIDs to some second STAs in the STA multi-link device, and links on which the STAs operate are links in a candidate link set managed by the first AP. Optionally, there are a plurality of methods for allocating an AID by the AP to the STA. For example, for a method for allocating an AID by the AP to the STA, refer to descriptions in steps S1301 to 1305.

For example, for each BSS, the first AP allocates one AID to a STA operating on a primary link in the STA multi-link device in the BSS. The first AP allocates one or two AIDs to a STA operating on each secondary link in the STA multi-link device in the BSS.

For example, in the second implementation, when a first bit in a bitmap control field in the TIM element indicates whether the second STA operating on the primary link has a downlink multicast traffic, a corresponding bit in the partial virtual bitmap field in the TIM element may be used to indicate whether the second STA operating on the primary link in the STA multi-link device has a corresponding downlink unicast traffic. The first AP allocates one AID to the second STA operating on the primary link, and whether a bit that is corresponding to the AID of the second STA operating on the primary link and that is in the partial virtual bitmap field in the TIM element is set to 1 is used to indicate whether the second STA has a downlink unicast traffic. In an implementation in which the first AP allocates one AID to the second STA operating on the secondary link in the STA multi-link device, whether a bit that is corresponding to the AID of the second STA and that is in the partial virtual bitmap field in the TIM element is set to 1 is used to indicate whether the second STA has a downlink unicast traffic or a downlink multicast traffic. In other words, the one AID allocated by the first AP to the second STA operating on the secondary link corresponds to both the downlink unicast traffic and the downlink multicast traffic. In an implementation in which the first AP allocates two AIDs to the second STA operating on the secondary link in the STA multi-link device, one AID is used to indicate whether the second STA corresponding to the AID has a downlink unicast traffic, and the other AID is used to indicate whether the second STA corresponding to the AID has a downlink multicast traffic. For example, the first AP may allocate two AIDs to the second STA operating on the secondary link, and whether a bit that is corresponding to one AID and that is in the partial virtual bitmap field in the TIM element is set to 1 is used to indicate whether the second STA has a downlink unicast traffic. Whether a bit that is corresponding to the other AID and that is in the partial virtual bitmap field in the TIM element is set to 1 is used to indicate whether the second STA has a downlink multicast traffic.

For example, in the second implementation, when the first bit in the bitmap control field in the TIM element is used to indicate whether the first STA has a downlink multicast traffic, a value of 1 of the first bit in the bitmap control field in the TIM element indicates that the first STA has a downlink multicast traffic. The downlink multicast traffic may be sent to the second STA operating on the primary link, or may be sent to the second STA operating on the secondary link. In this case, the downlink multicast traffic may be sent after a DTIM beacon frame is sent on the primary link. It may be understood that, in this implementation, the first bit in the bitmap control field in the TIM element functions in both cases in which the downlink multicast traffic is sent to the second STA operating on the primary link and the downlink multicast traffic is sent to the second STA operating on the secondary link. Optionally, a multicast traffic frame may include the identifier information of a link, to further notify the first STA of a link on which a second STA, in the plurality of second STAs included in the first STA, to which the multicast traffic frame is sent operates. In this implementation, the first AP only needs to allocate one AID to the second STA operating on the secondary link, and whether a bit that is corresponding to the AID and that is in the partial virtual bitmap field in the TIM element is set to 1 is used to indicate whether the second STA has a downlink unicast traffic.

It may be understood that when the first AP allocates one or two AIDs to the second STA operating on the secondary link, the second STA operating on the secondary link may be some or all of the second STAs included in the first STA, and the first AP allocates one or two AIDs to each of the some or all of the second STAs.

For example, in the foregoing second implementation, whether there is a downlink traffic on each link is indicated by using a correspondence between an AID and a link, without changing a structure of the existing TIM element field. This presents better compatibility, and reduces signaling overheads as additional information is not required to identify each link.

For example, the downlink unicast traffic sent by the AP multi-link device to the station multi-link device may be a unicast traffic on any link. In this implementation, for the downlink unicast traffic, the plurality of second STAs of the station multi-link device may share one AID, and the AID may be an AID of the station multi-link device. For example, whether a bit that is corresponding to the AID and that is in the partial virtual bitmap field in the TIM element is set to 1 is used to indicate whether the STA multi-link device has a downlink unicast traffic. When the TIM element indicates that the STA multi-link device has a downlink unicast traffic, the second STA operating on the primary link receives the downlink unicast traffic, or the second STA operating on any secondary link receives the downlink unicast traffic. The AP multi-link device allocates one AID to a second STA operating on each secondary link in the station multi-link device, and whether a bit that is corresponding to the AID and that is in the partial virtual bitmap field in the TIM element is set to 1 is used to indicate whether the second STA has a downlink multicast traffic. Alternatively, the first bit in the bitmap control field in the TIM element is used to indicate whether the first STA has a downlink multicast traffic, without indicating a specific second STA that has a downlink multicast traffic from the first STA. The downlink multicast traffic is sent after the DTIM beacon frame is sent on the primary link. During transmission, the multicast traffic optionally carries a link identifier information field.

The multicast traffic is related to the link, and multicast traffics on links may be different or the same.

If the first STA includes only one second STA, and a link on which the second STA operates may be changed and switched, the first AP may allocate a plurality of AIDs to the second STA, and AIDs corresponding to the second STA operating on different links are different. For example, the second STA corresponds to one AID when operating in the 5 GHz frequency band, and corresponds to another AID when operating in the 6 GHz frequency band. Based on the correspondence between an AID and a link, the first STA that receives the multicast traffic frame may determine a link corresponding to the downlink multicast traffic.

Optionally, the TIM element may further include a special field, and the special field may be a multi-link identifier bitmap field or one or more link identifier information fields. The multi-link bitmap field or the one or more link information fields is/are used to indicate one or more links for receiving a downlink traffic of the station multi-link device. One bit in the multi-link identifier bitmap field may correspond to one link. When a value of one or more bits is a first value, for example, 1, it indicates that one or more links corresponding to the one or more bits are used to receive the downlink traffic. When a value of one or more bits is a second value, for example, 0, it indicates that one or more links corresponding to the one or more bits are not used to receive the downlink traffic. The one or more identifier information fields carry identifier information used to distinguish different links. The downlink traffic includes a downlink multicast traffic and/or a downlink unicast traffic. In this implementation, the AP multi-link device may allocate one or more AIDs to the station multi-link device.

In a second case, the downlink traffic indication information may be carried in a TIM element field in a TIM frame. Optionally, the TIM frame includes a frame control field, a duration field, an address 1 field, an address 2 field, a BSSID, a sequence control field, a frame carrier field, and an FCS (frame check sequence) field. An action field of the TIM frame is located in the frame carrier field.

In a WNM-based power-saving mechanism or a TWT-based power-saving mechanism, the STA may communicate with the AP about an awake period, and the AP sends a broadcast TIM frame to a plurality of corresponding STAs at the start of each awake period. The TIM frame is much shorter than a beacon frame, and a TIM element included in the TIM frame is used to notify the plurality of STAs whether there is a corresponding downlink traffic indication. In this case, because the TIM frame is much shorter than the beacon frame, the STA may obtain a power saving effect. In the WNM-based mechanism, a TIM broadcast interval field in a TIM request frame sent by the STA or a TIM response returned by the AP is used to indicate the awake period. Alternatively, in the TWT-based mechanism, the awake period corresponds to a TWT awake interval in the TWT-based mechanism, where the TWT awake interval is calculated based on a TWT awake duration decimal field and a TWT awake interval exponent field in a TWT element. Specifically, TWT awake interval=TWT awake duration decimal*$2^{(TWT\ awake\ interval\ exponent)}$.

Optionally, the frame carrier field in the TIM frame may further include at least one of the following: a type field, an unprotected wireless network management (WNM) action field, a timestamp field, a beacon check field, and a link identifier information field. The unprotected WNM action field is used to indicate different action values. The timestamp field is used to indicate clock information. The beacon check field is used to indicate whether a key BSS parameter is updated in a BSS in which a link indicated by the link identifier information field is located, or the beacon check field is used to indicate whether a key parameter is updated for the link indicated by the link identifier information field. The link identifier information field is used to identify a specific link.

For example, if a key BSS parameter is updated in the BSS in which the link indicated by the link identifier information field is located, or a key parameter is updated for the link indicated by the link identifier information field, a value of the beacon check field is incremented by 1. For example, when determining that a key BSS parameter is updated in a BSS of a link, the first AP increases a value of a beacon check field in a traffic by 1, where link identifier information in the traffic indicates the link. The BSS parameter may also be understood as a link parameter.

For example, each time the STA multi-link device maintain a record of a value of a beacon check field corresponding to each link received last time. If a value of a beacon check field corresponding to a link in a recently received traffic is different from a value of a beacon check field corresponding to the link received last time, the STA multi-link device receives, on the link, a beacon frame sent from the AP multi-link device.

For example, the key BSS parameter may include one or more of the following information: inclusion of a channel switch announcement element, inclusion of an extended channel switch announcement element, modification of the EDCA parameters element, inclusion of a quiet element, modification of the DSSS parameter set, modification of the CF parameter set element, modification of the HT operation element, inclusion of a wide bandwidth channel switch element, inclusion of a channel switch wrapper element, inclusion of an operating mode notification element, inclusion of a quiet channel element, modification of the VHT (very high throughput) operation element, modification of the HE (high efficient) operation element, insertion of a broadcast TWT element, inclusion of the BSS color change announcement element, modification of the MU EDCA parameter set element, or modification of the spatial reuse parameter set element. One or more of the foregoing key BSS parameters may also be listed as the key parameter of the link.

For example, an action value of the unprotected WNM action field is shown in Table 2.

TABLE 2

| Action value | |
|---|---|
| 0 | TIM traffic indication map |
| 1 | Time measurement |
| 2-255 | Reserved |

For example, as shown in Table 2, the action value is set to one of the reserved values to indicate that the TIM frame is a frame including the foregoing downlink traffic indication information. The downlink traffic indication information includes at least one of the information used to indicate whether the second STA operating on the primary link has a downlink traffic, or the information used to indicate whether the second STA operating on the secondary link has a downlink traffic. Optionally, the TIM frame may be referred to as a multi-link TIM frame. In other words, the reserved value indicates that the TIM frame is a multi-link TIM frame. In other words, a reserved value, for example, 2, of the unprotected WNM action field in Table 2 may be used to distinguish the multi-link TIM frame from a conventional TIM frame. A specific value of the reserved value of the unprotected WNM action field is not limited in this embodiment of this application. For example, the value may alternatively be another value between 2 and 255. The value of 2 is merely an example for description herein.

Figure 7:
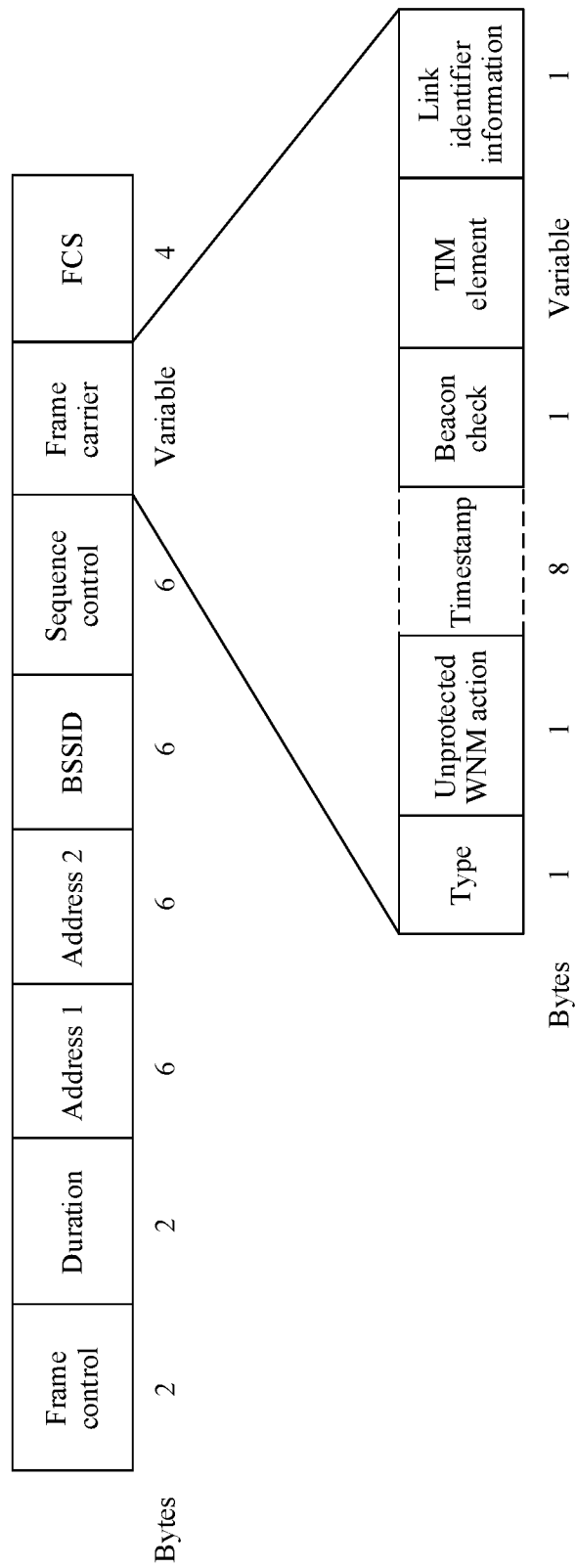
FIG. 7 is a schematic diagram of a frame structure of a multi-link TIM frame according to an embodiment of this application.

In an implementation, a frame structure of the multi-link TIM frame is shown in FIG. 7. An action field in the multi-link TIM frame is located in a frame carrier, and the frame carrier includes a type field, an unprotected WNM action field, a beacon check field, a TIM element field, and a link identifier information field. Optionally, the frame carrier may further include a timestamp field. The multi-link TIM frame shown in FIG. 7 is used to indicate whether a plurality of stations operating on links indicated by link identifier information fields have a downlink traffic.

It may be understood that, because the multi-link TIM frame includes the link identifier information field, when the multi-link TIM frame is used, though the STA multi-link device includes a plurality of second STAs in one BSS, only one AID is required. In addition, based on the identifier information and the AID of the link, a station that operates on the link indicated by the link identifier information field and has a downlink traffic can be determined.

For example, the link identifier information field may be a special field used to indicate links in the station multi-link device that are used to receive a downlink traffic. In an implementation, the special field includes a special link identifier. A special MAC address (or a BSSID) or a combination of an operating class and a channel number, or a combination thereof, is used to indicate that all links of the station multi-link device (the first STA) are used to receive a downlink traffic. In another implementation, the special field may alternatively be a multi-link identifier bitmap field or one or more link identifier information fields. The multi-link identifier bitmap field or the one or more link identifier information fields is/are used to indicate one or more links for receiving a downlink traffic of the station multi-link device. For example, when a value of a bit that is corresponding to an AID of the station multi-link device and that is in the partial virtual bitmap field in a TIM element is 1, it is determined that the station multi-link device has a downlink traffic. Then, the downlink traffic sent by the AP may be received on one or more links indicated by the multi-link identifier bitmap field or the multi-link identifier information field. One bit in the multi-link identifier bitmap field may correspond to one link, and when a value of one or more bits is 1, it indicates that one or more links corresponding to the one or more bits are used to receive the downlink traffic. Optionally, a PS-Poll may be sent by a station operating on the primary link in the station multi-link device, or the PS-Poll may be sent by each of a plurality of stations operating on the secondary link in the station multi-link device.

Optionally, the multi-link TIM frame may not include the link identifier information field. When the multi-link TIM frame does not include the link identifier information field, the multi-link TIM frame may be used to indicate whether the station multi-link device (the first STA) has a downlink traffic.

For example, the multi-link TIM frame shown in FIG. 7 includes a field indicating identifier information of a link, and the field indicating the identifier information of a link is used to identify a specific link. For example, with reference to FIG. 6, the first STA is the STA multi-link device 2, and a primary link determined by the STA multi-link device 2 is the link 2. In this case, the first AP may send the multi-link TIM frame to the STA multi-link device 2 over the link 2. If a link indicated by the link identifier information in the multi-link TIM frame is the link 3, and a value of a bit that is corresponding to an AID of the STA multi-link device 2 and that is in the partial virtual bitmap field in the TIM element is 1, it indicates that downlink traffic data of the STA 2-2 operating on the link 3 in the STA multi-link device 2 is buffered in the first AP.

Figure 8:
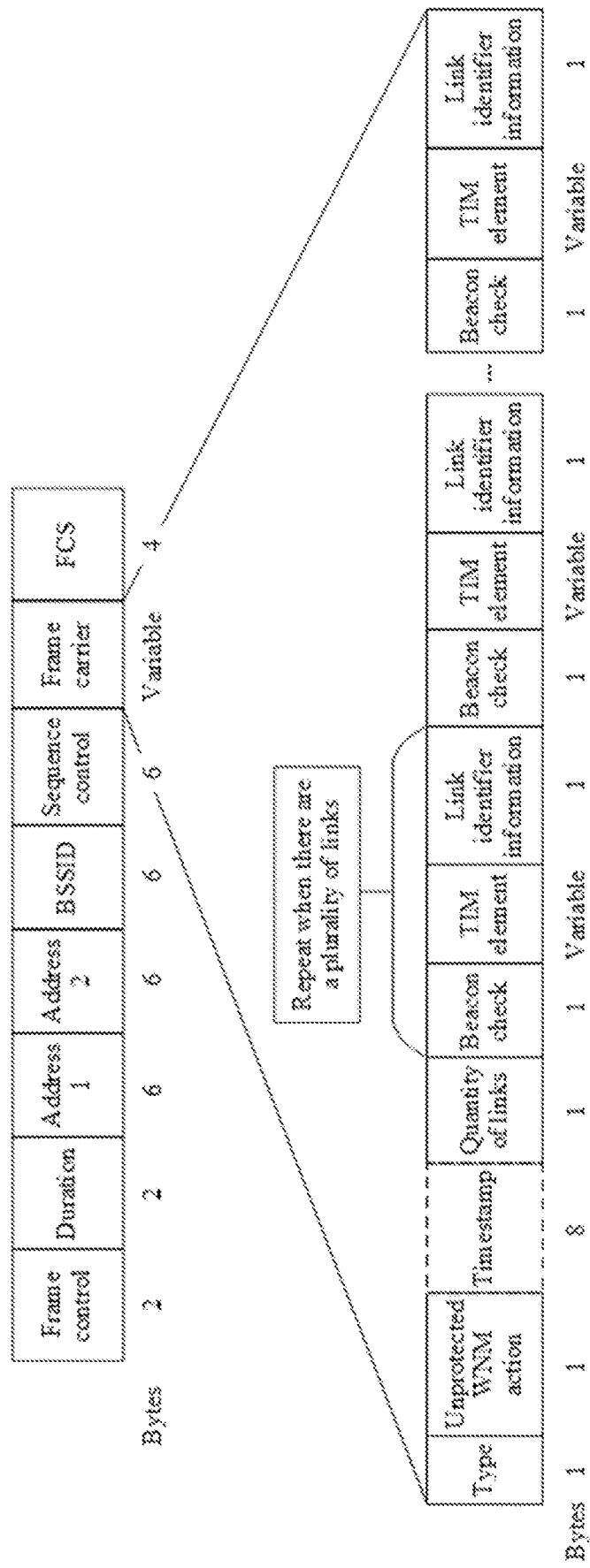
FIG. 8 is a schematic diagram of a frame structure of another multi-link TIM frame according to an embodiment of this application.

In another implementation, a frame structure of the multi-link TIM frame is shown in FIG. 8. An action field of the multi-link TIM frame is located in a frame carrier, and the frame carrier further includes a link quantity field in addition to a type field and an unprotected WNM action field. When the link quantity field indicates a plurality of links, each link further includes a beacon check field, a TIM element field, and a link identifier information field. Optionally, the frame carrier may further include one or more timestamp fields. The multi-link TIM frame shown in FIG. 8 is used to indicate whether a plurality of stations operating on links indicated by link identifier information fields have a downlink traffic.

It should be noted that the beacon check field and the link identifier information field included in the TIM frame or the multi-link TIM frame may alternatively be placed in another management frame, and the plurality of fields may be independently used to notify whether the BSS parameter of the link indicated by the link identifier information field is changed. For whether BSS parameters of a plurality of links are changed, the foregoing method may also be used. For example, the frame carrier includes a link quantity field, n beacon check fields, and n link identifier information fields, where n is indicated by the link quantity field. For another example, the frame carrier includes a link identifier bitmap and n beacon check fields, and optionally includes a length field of the link identifier bitmap, where n is a quantity of bits whose values are first values (for example, 1) in the link identifier bitmap. Values of one or more beacon check fields are initialized to 0.

For example, the multi-link TIM frame shown in FIG. 8 includes a field indicating a quantity of links and the link identifier information field, where the link identifier information field is used to identify a specific link. Different from the multi-link TIM frame shown in FIG. 7 that only indicates whether a plurality of stations operating on links have a downlink traffic, the multi-TIM frame shown in FIG. 8 indicates whether a plurality of stations operating on a plurality of links have a downlink traffic. For example, with reference to FIG. 6, the first STA is the STA multi-link device 2, and the primary link determined by the STA multi-link device 2 is the link 2. In this case, the first AP may send the multi-link TIM frame to the STA multi-link device 2 (or the STA 2-1 operating on the link 2) over the link 2. If a quantity of links indicated by the link quantity field in the multi-link TIM frame is 2, links indicated by the link identifier information field are the link 2 and the link 3, and the value of the bit that is corresponding to an AID of the STA multi-link device 2 and that is in the partial virtual bitmap field in the TIM element is 1, the TIM element in the multi-link TIM frame indicates that downlink traffic data of both the STA 2-1 operating on the link 2 and the STA 2-2 operating on the link 3 in the STA multi-link device 2 is buffered in the first AP It should be noted that, though the STA multi-link device 2 herein includes a plurality of second STAs in one BSS, only one AID is required. In addition, based on the AID and the identifier information of the link, a station that operates on the link indicated by the link identifier information field and has a downlink traffic can be determined.

It should be noted that in this embodiment of this application, the first AP allocates one or two AIDs to the STA operating on each link in the STA multi-link device, without changing a frame format of an existing beacon frame or a management frame. This helps determine a link on which a second STA, in the STA multi-link device, that has a downlink traffic operates. Alternatively, an existing frame format may be changed to the multi-link TIM frame, where the multi-link TIM frame includes the field indicating the identifier information of a link, and may optionally include a field indicating a quantity of links. This helps determine a station that operates on the link indicated by the link identifier information field and has a downlink traffic.

A power-saving mode or a non-power-saving mode of the station multi-link device (for example, the first STA) may be separately set by each second STA, or may be set by the second STA operating on the primary link. Specifically, the power-saving mode or the non-power-saving mode may be set by a power management bit in a frame control field in a MAC header in a MAC frame. When the station multi-link device (for example, the first STA) is in the power-saving mode, the second STA operating on the primary link in the station multi-link device (for example, the first STA) periodically receives a beacon frame, and the second STA operating on the secondary link may not need to periodically receive the beacon frame.

S504: The second STA operating on the primary link receives the downlink traffic indication information from the first AP.

For example, the second STA operating on the primary link may receive the beacon frame, another management frame, or the TIM frame sent by the first AP. The second STA operating on the primary link may determine, based on the downlink traffic indication information, whether the second STA operating on the primary link has a downlink traffic, or may determine whether the second STA operating on the secondary link has a downlink traffic.

For example, with reference to FIG. 6, an example in which the first STA is the STA multi-link device 2, and the primary link is the link 2 is used. The STA 2-1 operating on the link 2 in the STA multi-link device 2 receives the beacon frame from the first AP, and may determine, based on a TIM element in the beacon frame, whether the STA 2-1 operating on the link 2 and the STA 2-2 operating on the link 3 has a downlink traffic. If an AID of the STA 2-1 is 1, an AID corresponding to a downlink unicast traffic of the STA 2-2 is 2, and an AID corresponding to a downlink multicast traffic of the STA 2-2 is 3, the STA 2-1 operating on the link 2 may determine, based on the beacon frame, that a value of a bit corresponding to the AID 3 in a partial virtual bitmap field in the TIM element is 1. In other words, the STA 2-1 operating on the link 2 may determine that the STA 2-2 operating on the link 3 in the STA multi-link device 2 has a downlink multicast traffic.

It should be noted that, in this embodiment of this application, the second STA operating on the primary link may receive the downlink traffic indication information from the first AP, and determine, based on the downlink traffic indication information, whether the second STA operating on the primary link and the second STA operating on the secondary link have a downlink traffic. In other words, in this embodiment of this application, downlink traffic information of the primary link and/or downlink traffic information of the secondary link are/is sent over the primary link, so that the second STA operating on the primary link can determine whether the second STA operating on the primary link has a downlink traffic, and can determine whether the second STA operating on the secondary link has a downlink traffic. Therefore, all second STAs included in the STA multi-link device do not need to receive downlink traffic indications on respective links.

It may be understood that, the second STA operating on the primary link may receive the information indicating whether the second STA operating on the primary link has a downlink traffic, and the information indicating whether the second STA operating on the secondary link has a downlink traffic. Therefore, the second STA operating on the secondary link may not receive, on the secondary link on which the second STA operates, information indicating whether there is a downlink traffic on the secondary link. In other words, when no data is transmitted, the second STA operating on the secondary link may enter a doze state. This reduces power consumption of the station multi-link device.

The AP multi-link device may send a downlink unicast traffic or a downlink multicast traffic to the second STA operating on the secondary link in the station multi-link device over the primary link or the secondary link. Specifically, whether to send the traffic over the primary link or the secondary link may be negotiated by the AP multi-link device and the station multi-link device by using a management frame, or directly specified in a protocol. Alternatively, a combination of the two is used (the downlink unicast traffic and the downlink multicast traffic are sent in different manners). This is not limited in this embodiment of this application.

Figure 9:
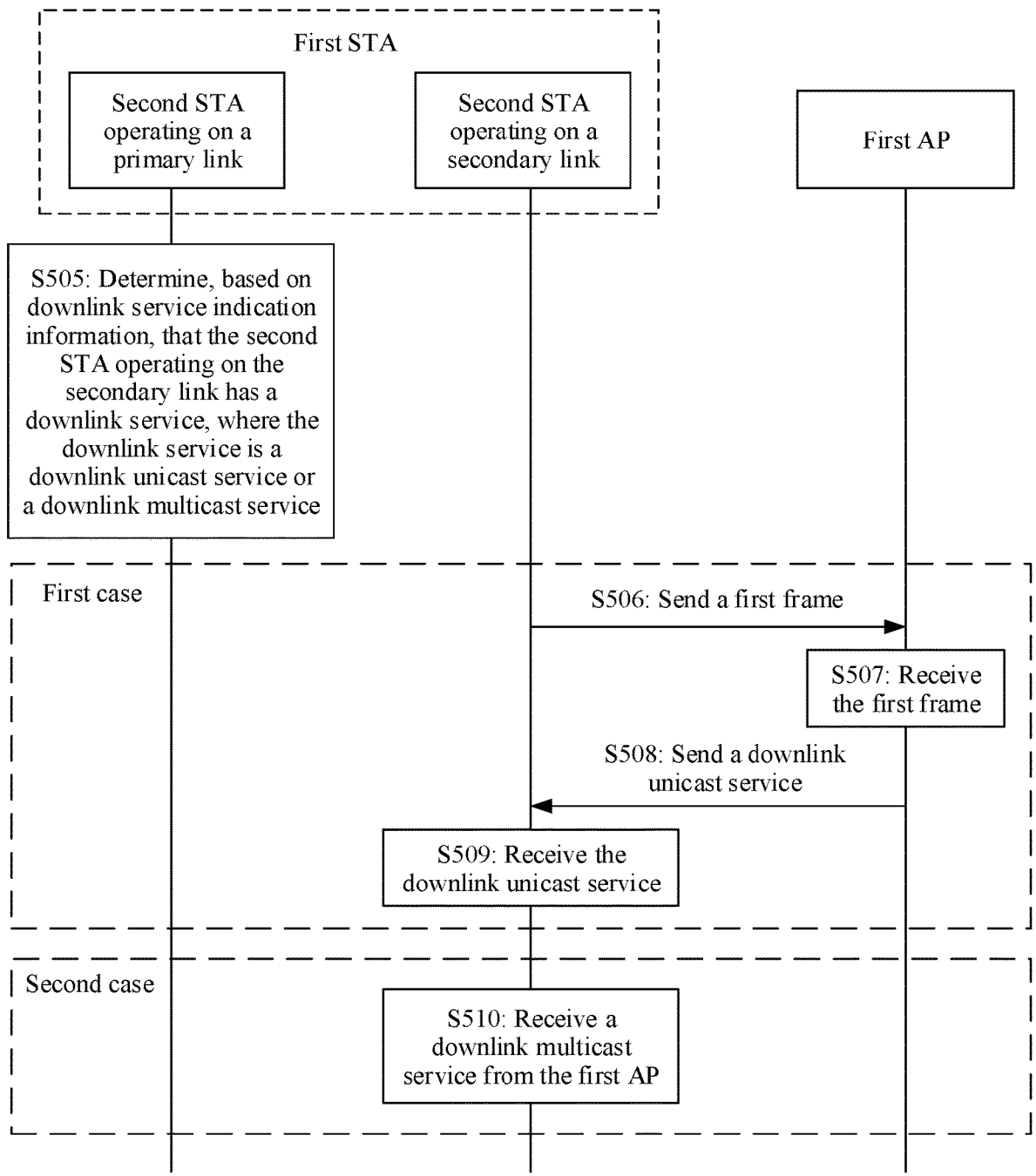
FIG. 9 is a schematic flowchart of another communication method between multi-link devices according to an embodiment of this application.

An embodiment of this application further provides a communication method between multi-link devices. As shown in FIG. 9, when the foregoing downlink traffic is a downlink unicast traffic or a downlink multicast traffic sent to a second STA operating on a secondary link, the method may further include steps S505 to S510 after step S504.

S505: A second STA operating on a primary link determines, based on downlink traffic indication information, that the second STA operating on the secondary link has a downlink traffic.

For example, the second STA operating on the primary link may determine, based on the downlink traffic indication information in a TIM element field, that the second STA operating on the secondary link has the downlink unicast traffic or the downlink multicast traffic transmitted on the secondary link.

For example, with reference to FIG. 6, an example in which the first STA is the STA multi-link device 2, and the primary link is the link 2 is used. An AID corresponding to a downlink unicast traffic of the STA 2-1 is 1, an AID corresponding to a downlink unicast traffic of the STA 2-2 is 2, and an AID corresponding to a downlink multicast traffic of the STA 2-2 is 3. If a value of a bit corresponding to the AID 2 in a partial virtual bitmap field in the TIM element field is 1, the STA 2-1 operating on the link 2 may determine that the STA 2-2 operating on the link 3 has a downlink unicast traffic.

Optionally, if the second STA operating on the primary link determines, based on the downlink traffic indication information, that the second STA operating on the secondary link has no downlink traffic, the second STA operating on the secondary link is in an awake state or a doze state.

For example, there may be two cases for the determining, in step S505, that the second STA operating on the secondary link has a downlink unicast traffic or a downlink multicast traffic. The following describes the two cases in detail.

In a first case, after it is determined in step S505 that the second STA operating on the secondary link has a downlink traffic, which is a downlink unicast traffic, when the downlink unicast traffic is transmitted by a first AP on the secondary link, steps S506 to S509 are performed after step S505.

S506: The second STA operating on the secondary link sends a first frame to the first AP.

The first frame is used to indicate that the second STA operating on the secondary link is in an awake state (which may also be referred to as an active state). For example, the first frame may be a PS-Poll frame, or may be a multi-link PS-Poll frame. A specific form of the first frame is not limited in this embodiment of this application, and is merely an example for description herein.

For example, the second STA operating on the primary link and the STA operating on the secondary link may exchange data. Therefore, when the second STA operating on the primary link determines that the second STA operating on the secondary link has a downlink unicast traffic, the second STA and a first STA operating on the primary link may indicate the second STA operating on the secondary link to enter from a doze state to an awake state, and to send a PS-Poll frame or a multi-link PS-Poll frame to the first AP for notifying the first AP that the second STA operating on the secondary link is in an awake state.

For example, with reference to FIG. 6, an example in which the first STA is the STA multi-link device 2, and the primary link is the link 2 is used. If the STA 2-1 operating on the link 2 determines that the STA 2-2 operating on the link 3 has a downlink unicast traffic, the STA 2-2 operating on the link 3 enters an awake state from a doze state, and sends a PS-Poll frame or a multi-link PS-Poll frame to the AP multi-link device for notifying the first AP that the STA 2-2 operating on the link 3 is in an awake state.

For example, the first STA (or the second STA operating on the primary link) may alternatively send the first frame (for example, the PS-Poll frame or the multi-link PS-Poll frame) to the first AP on the primary link. The first frame carries identifier information of the secondary link to notify the first AP of a link that is in an awake state, and may be used to receive a downlink traffic sent by the first AP on the secondary link. The first frame is sent by a station operating on the secondary link.

S507: The first AP receives the first frame.

For example, the first AP receives the PS-Poll frame or the multi-link PS-Poll frame from the second STA operating on the secondary link, and may determine that the second STA operating on the secondary link is in an awake state.

For example, with reference to FIG. 6, the AP multi-link device receives a PS-Poll frame or a multi-link PS-Poll frame sent by the STA 2-2 operating on the link 3, and determines that the STA 2-2 operating on the link 3 is in an awake state.

S508: The first AP sends the downlink unicast traffic to the second STA operating on the secondary link.

For example, after receiving the PS-Poll frame or the multi-link PS-Poll frame, the first AP may export buffered data of the second STA operating on the secondary link that is buffered in a buffer of the first AP, and send the downlink unicast traffic to the second STA operating on the secondary link. For example, after receiving the PS-Poll frame or the multi-link PS-Poll frame from the second STA operating on the secondary link, the first AP may send, over the secondary link, a buffered downlink unicast traffic of the STA to the second STA operating on the secondary link.

For example, with reference to FIG. 6, the AP multi-link device sends the downlink unicast traffic to the STA 2-2 operating on the link 3.

S509: The second STA operating on the secondary link receives the downlink unicast traffic from the first AP.

For example, the second STA that is in an awake state and operates on the secondary link may receive the downlink unicast traffic sent by the first AP. Optionally, after the second STA operating on the secondary link receives the downlink unicast traffic from the first AP, if no data is transmitted on the second STA operating on the secondary link, a specific manner may be performed: The second STA includes information bits, for example, a more data field in a MAC header, in a transmitted frame, to inform that the second STA operating on the secondary link may enter a doze state, so as to reduce power consumption.

For example, with reference to FIG. 6, the STA 2-2 operating on the link 3 receives a downlink unicast traffic from the AP multi-link device. Optionally, after the STA 2-2 operating on the link 3 receives the downlink unicast traffic from the AP multi-link device, if no data is transmitted on the STA 2-2 operating on the link 3, the STA 2-2 operating on the link 3 may enter a doze state from an awake state to reduce power consumption.

In a second case, after it is determined in step S505 that the second STA operating on the secondary link has a downlink traffic, which is a downlink multicast traffic, when the downlink multicast traffic is transmitted by the first AP on the secondary link, step S510 are performed after step S505.

S510: The second STA operating on the secondary link receives the downlink multicast traffic from the first AP.

For example, before step S510, the second STA operating on the primary link may receive the downlink traffic indication information from the first AP, and determine, based on the downlink traffic indication information, that the second STA operating on the secondary link has a downlink multicast traffic. Then in step S510, the second STA operating on the secondary link may receive the downlink multicast traffic from the first AP. Optionally, the downlink traffic indication information may be carried in a DTIM frame.

Optionally, before step S510, the second STA operating on the secondary link may receive the DTIM frame from the first AP, and then receive the downlink multicast traffic sent by the first AP after the DTIM frame is received.

Figure 10:
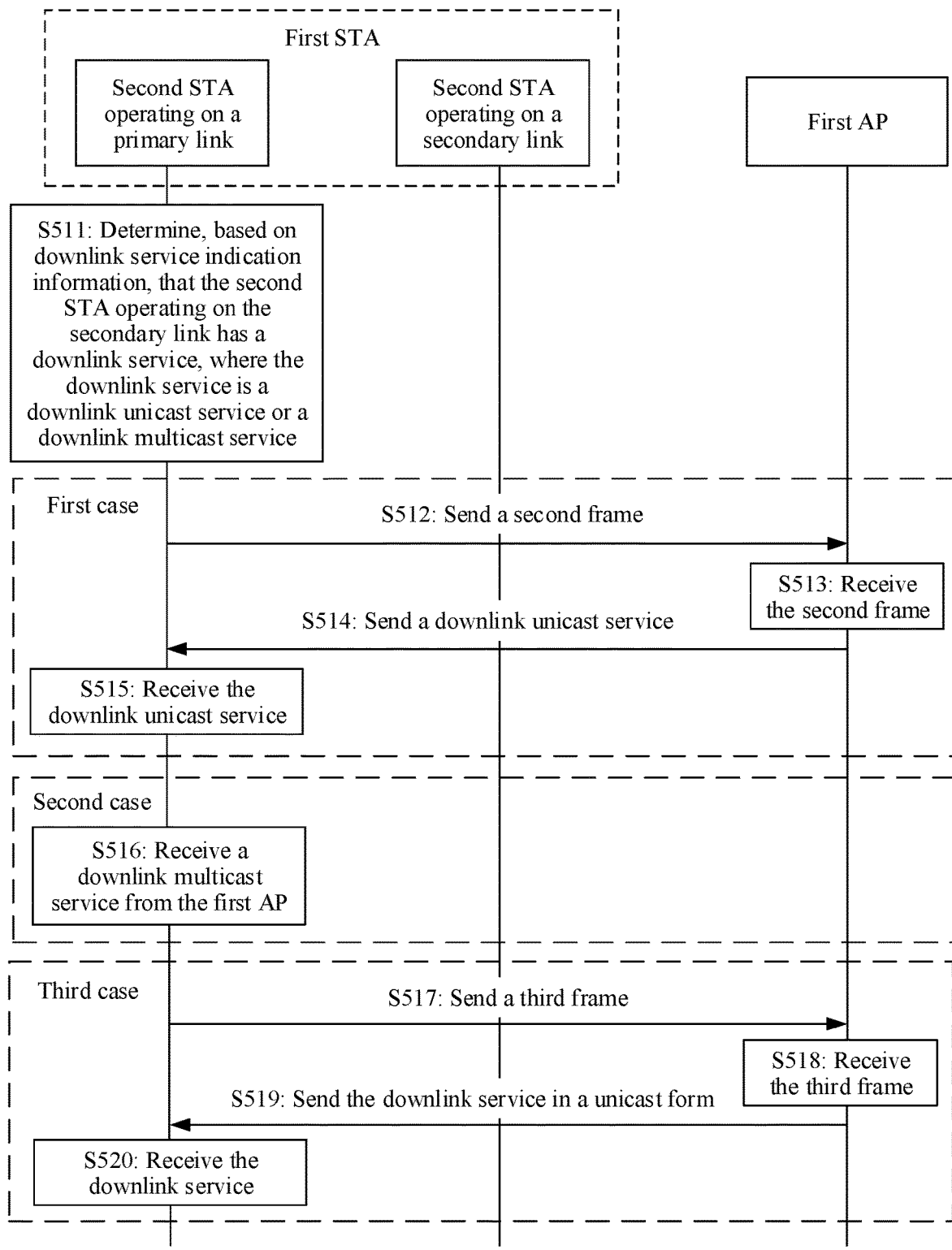
FIG. 10 is a schematic flowchart of another communication method between multi-link devices according to an embodiment of this application.

Optionally, an embodiment of this application further provides a communication method between multi-link devices. As shown in FIG. 10, when the foregoing downlink traffic is a downlink unicast traffic or a downlink multicast traffic sent to a second STA operating on a secondary link, the method may further include steps S511 to S520 after step S504.

S511: A second STA operating on a primary link determines, based on downlink traffic indication information, that the second STA operating on the secondary link has a downlink traffic.

For example, the second STA operating on the primary link may determine, based on the downlink traffic indication information in a TIM element field, that the second STA operating on the secondary link has a downlink unicast traffic or a downlink multicast traffic transmitted on the primary link.

For example, with reference to FIG. 6, an example in which the first STA is the STA multi-link device 2, and the primary link is the link 2 is used. An AID of the STA 2-1 is 1, an AID corresponding to a downlink unicast traffic of the STA 2-2 is 2, and an AID corresponding to a downlink multicast traffic of the STA 2-2 is 3. If a value of a bit corresponding to the AID 3 in a partial virtual bitmap field in the TIM element field is 1, the STA 2-1 operating on the link 2 may determine that the STA 2-2 operating on the link 3 has a downlink multicast traffic. The downlink multicast traffic is a multicast traffic transmitted on the link 2.

When it is determined in step S511 that the second STA operating on the secondary link has a downlink unicast traffic or a downlink multicast traffic, there may be three cases. The following describes the three cases in detail.

In a first case, after it is determined in step S511 that the second STA operating on the secondary link has a downlink traffic, which is a downlink unicast traffic, when the downlink unicast traffic is transmitted by the first AP on the primary link, steps S512 to S515 are performed after step S511.

S512: The second STA operating on the primary link sends a second frame to the first AP.

The second frame is used to indicate that the second STA operating on the primary link is in an awake state (which may also be referred to as an active state). For example, the second frame may be a PS-Poll frame, or may be a multi-link PS-Poll frame. A specific form of the second frame is not limited in this embodiment of this application, and is merely an example for description herein.

Optionally, the second frame may carry identifier information of the secondary link.

S513: The first AP receives the second frame.

S514: The first AP sends the downlink unicast traffic to the second STA operating on the primary link.

S515: The second STA operating on the primary link receives the downlink unicast traffic from the first AP.

For example, the second STA operating on the primary link receives the downlink unicast traffic from the first AP, and forwards the downlink unicast traffic to the second STA operating on the secondary link.

In a second case, after it is determined in step S511 that the second STA operating on the secondary link has a downlink traffic, which is a downlink multicast traffic, when the downlink multicast traffic is transmitted by the first AP on the primary link, step S516 is performed after step S511.

S516: The second STA operating on the primary link receives the downlink multicast traffic from the first AP.

For example, before step S516, the second STA operating on the primary link receives the downlink traffic indication information from the first AP, and determines, based on the downlink traffic indication information, that the second STA operating on the secondary link has a downlink multicast traffic. Then in step S516, the second STA operating on the primary link receives the downlink multicast traffic from the first AP. Optionally, the second STA operating on the primary link may further receive a DTIM frame. After receiving the downlink multicast traffic, the second STA operating on the primary link may forward the downlink multicast traffic to the second STA operating on the secondary link.

In a third case, after it is determined in step S511 that the second STA operating on the secondary link has a downlink traffic, which is a downlink multicast traffic, when the downlink multicast traffic is transmitted by the first AP on the primary link, steps S517 to S520 are performed after step S511.

S517: The second STA operating on the primary link sends a third frame to the first AP.

The third frame is used to notify the first AP that the second STA operating on the primary link is in an awake state, and request the first AP to send the downlink multicast traffic to the second STA operating on the primary link in a unicast manner.

For example, the third frame may be a PS-Poll frame, or may be a multi-link PS-Poll frame. A specific form of the third frame is not limited in this embodiment of this application, and is merely an example for description herein.

Optionally, the third frame may carry the identifier information of the secondary link.

S518: The first AP receives the third frame.

For example, the first AP receives the PS-Poll frame or the multi-link PS-Poll frame from the second STA operating on the primary link, and may determine that the second STA operating on the primary link is in an awake state.

S519: The first AP sends the downlink traffic to the second STA operating on the primary link in a unicast manner.

The downlink traffic is sent to the second STA operating on the primary link in a unicast manner.

S520: The second STA operating on the primary link receives the downlink traffic.

For example, the second STA operating on the primary link may receive downlink traffic data from the first AP The second STA operating on the primary link may forward the received downlink traffic data to the second STA operating on the secondary link. It may be understood that, the second STA operating on the secondary link may always be in a doze state in this implementation.

It may be understood that, if the first AP transmits, over the secondary link, the downlink unicast traffic to the second STA operating on the secondary link, the second STA operating on the secondary link can receive the downlink unicast traffic transmitted by the first AP on the secondary link only after entering an awake state and sending a first frame to the first AP. However, if the first AP sends, over the primary link, the downlink unicast traffic of the second STA operating on the secondary link, the second STA operating on the secondary link does not need to enter an awake state to receive the traffic. Instead, the second STA operating on the primary link receives the downlink unicast traffic transmitted by the first AP on the primary link, and forwards the traffic to the second STA operating on the secondary link.

Figure 11:
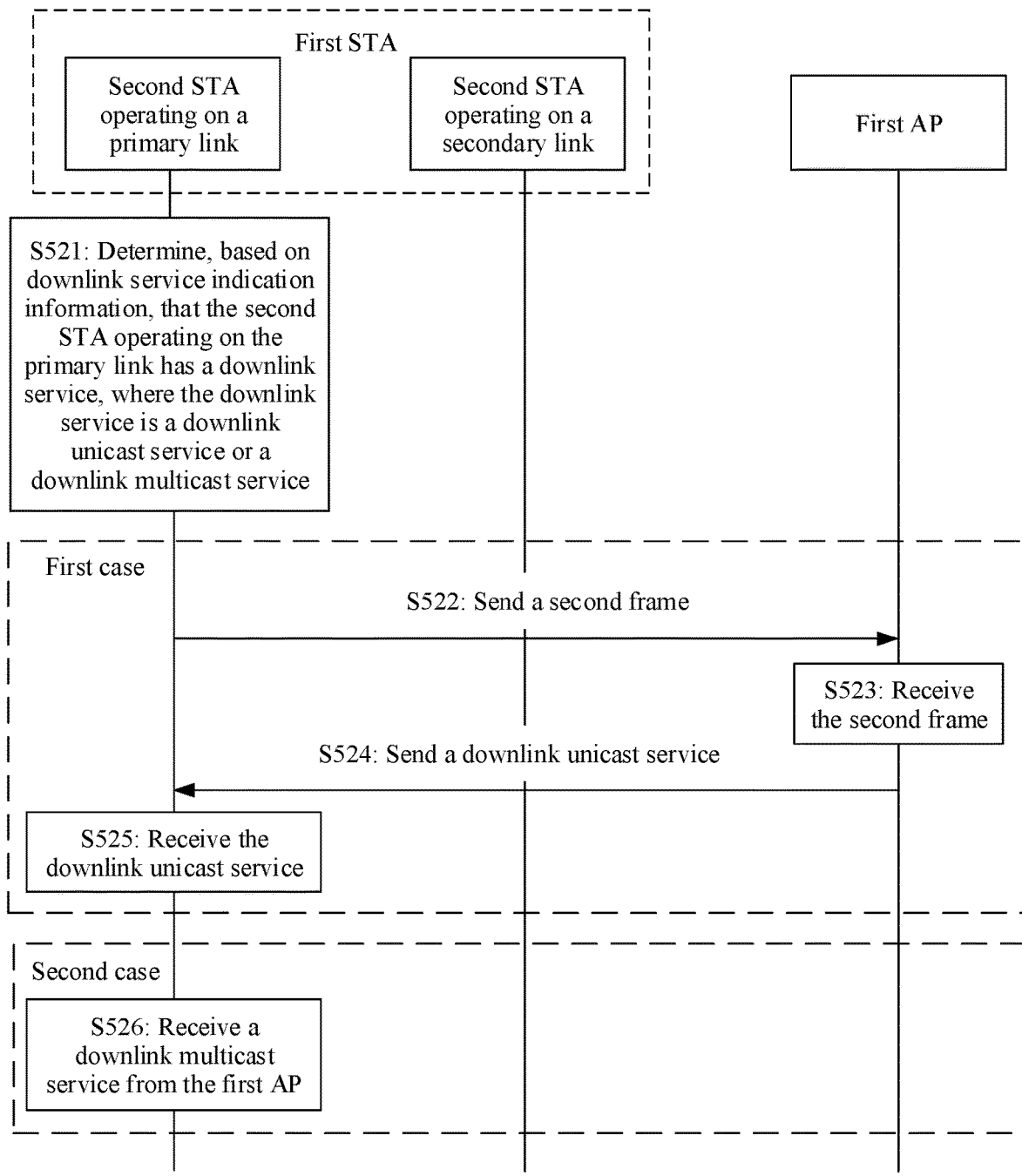
FIG. 11 is a schematic flowchart of still another communication method between multi-link devices according to an embodiment of this application.

For example, an embodiment of this application further provides a communication method between multi-link devices. As shown in FIG. 11, when the foregoing downlink traffic is a downlink multicast traffic or a downlink unicast traffic sent to a second STA operating on a primary link, the method may further include steps S521 to S526 after step S504.

S521: The second STA operating on the primary link determines, based on downlink traffic indication information, that the second STA operating on the primary link has a downlink traffic.

For example, the second STA operating on the primary link may determine, based on the downlink traffic indication information in a TIM element field, that the second STA operating on the primary link has a downlink unicast traffic or a downlink multicast traffic transmitted on the primary link.

For example, with reference to FIG. 6, an example in which the first STA is the STA multi-link device 2, and the primary link is the link 2 is used. An AID of the STA 2-1 is 1, an AID corresponding to a downlink unicast traffic of the STA 2-2 is 2, and an AID corresponding to a downlink multicast traffic of the STA 2-2 is 3. If a value of a bit corresponding to the AID 1 in a partial virtual bitmap field in the TIM element field is 1, the STA 2-1 operating on the link 2 may determine that there is a downlink unicast traffic on the link 2. The downlink unicast traffic may be a downlink unicast traffic transmitted on the link 2.

For example, when it is determined in step S521 that the second STA operating on the primary link has a downlink unicast traffic or a downlink multicast traffic, there may be two cases. The following describes the two cases in detail.

In a first case, after it is determined in step S521 that the second STA operating on the primary link has a downlink traffic, which is a downlink unicast traffic, when the downlink unicast traffic is transmitted by a first AP on the primary link, steps S522 to S525 are performed after step S521.

S522: The second STA operating on the primary link sends a second frame to the first AP.

S523: The first AP receives the second frame.

S524: The first AP sends the downlink unicast traffic to the second STA operating on the primary link.

S525: The second STA operating on the primary link receives the downlink unicast traffic from the first AP.

In a second case, after it is determined in step S521 that the second STA operating on the primary link has a downlink traffic, which is a downlink multicast traffic, when the downlink multicast traffic is transmitted by the first AP on the primary link, step S526 is performed after step S521.

S526: The second STA operating on the primary link receives the downlink multicast traffic from the first AP.

For example, before step S526, the second STA operating on the primary link may receive the downlink traffic indication information from the first AP; determine, based on the downlink traffic indication information, that the second STA operating on the primary link has a downlink multicast traffic; and then receive the downlink multicast traffic sent by the first AP. Optionally, the downlink traffic indication information received by the second STA operating on the primary link from the first AP may be carried in a DTIM frame.

It may be understood that in this embodiment of this application, when the second STA operating on the primary link determines that the STA has a downlink multicast traffic transmitted on the primary link, the second STA operating on the primary link may receive the downlink multicast traffic from the first AP after receiving the DTIM beacon frame.

Figure 12:
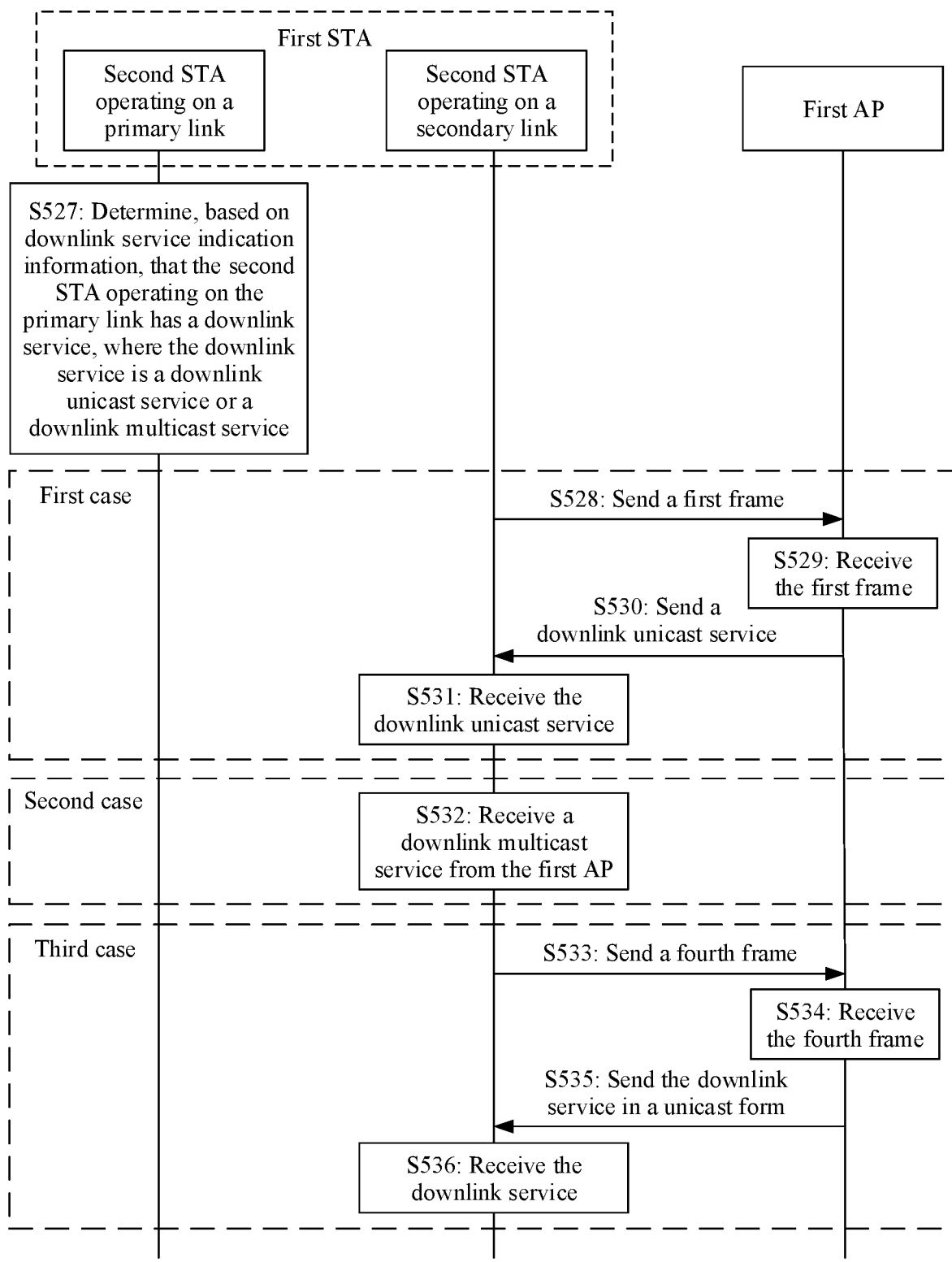
FIG. 12 is a schematic flowchart of yet another communication method between multi-link devices according to an embodiment of this application.

For example, an embodiment of this application further provides a communication method between multi-link devices. As shown in FIG. 12, when the foregoing downlink traffic is a downlink multicast traffic or a downlink unicast traffic sent to a second STA operating on a primary link, the method may further include steps S527 to S536 after step S504.

S527: The second STA operating on the primary link determines, based on downlink traffic indication information, that the second STA operating on the primary link has a downlink traffic.

For example, the second STA operating on the primary link may determine, based on the downlink traffic indication information in a TIM element field, that the second STA operating on the primary link has a downlink unicast traffic or a downlink multicast traffic transmitted on a secondary link.

For example, when it is determined in step S527 that the second STA operating on the primary link has a downlink unicast traffic or a downlink multicast traffic, there may be three cases. The following describes the three cases in detail.

In a first case, after it is determined in step S527 that the second STA operating on the primary link has a downlink traffic, which is a downlink unicast traffic, when the downlink unicast traffic is transmitted by the first AP on the secondary link, steps S528-S531 are performed after step S527.

S528: A second STA operating on the secondary link sends a first frame to the first AP.

S529: The first AP receives the first frame.

S530: The first AP sends the downlink unicast traffic to the second STA operating on the secondary link.

S531: The second STA operating on the secondary link receives the downlink unicast traffic from the first AP.

For example, the second STA operating on the secondary link receives the downlink unicast traffic from the first AP, and may forward the downlink unicast traffic to the second STA operating on the primary link.

In a second case, after it is determined in step S527 that the second STA operating on the primary link has a downlink traffic, which is a downlink multicast traffic, when the downlink multicast traffic is transmitted by the first AP on the secondary link, step S532 is performed after step S527.

S532: The second STA operating on the secondary link receives the downlink multicast traffic from the first AP.

For example, before step S532, the second STA operating on the primary link may receive the downlink traffic indication information from the first AP, and determine, based on the downlink traffic indication information, that the second STA operating on the primary link has a downlink multicast traffic. Then, the second STA operating on the secondary link may receive the downlink multicast traffic from the first AP. After receiving the downlink multicast traffic, the second STA operating on the secondary link may forward the downlink multicast traffic to the second STA operating on the primary link.

Optionally, before step S532, the second STA operating on the secondary link may receive a DTIM frame from the first AP, and then receive the downlink multicast traffic sent by the first AP after the DTIM frame is received.

It may be understood that in this embodiment of this application, when the second STA operating on the primary link determines that the STA has a multicast traffic that is transmitted on the secondary link, the second STA operating on the secondary link may receive the downlink multicast traffic from the first AP after receiving the DTIM beacon frame, and forwards the downlink multicast traffic to the second STA operating on the primary link.

In a third case, after it is determined in step S527 that the second STA operating on the primary link has a downlink traffic, which is a downlink multicast traffic, when the downlink multicast traffic is transmitted by the first AP on the secondary link, steps S533 to S536 are performed after step S527.

S533: The second STA operating on the secondary link sends a fourth frame to the first AP.

The fourth frame is used to notify the first AP that the second STA operating on the secondary link is in an awake state, and request the first AP to send the downlink multicast traffic to the second STA operating on the secondary link in a unicast manner.

For example, the fourth frame may be a PS-Poll frame, or may be a multi-link PS-Poll frame. A specific form of the fourth frame is not limited in this embodiment of this application, and is merely an example for description herein.

Optionally, the fourth frame may carry identifier information of the primary link.

S534: The first AP receives the fourth frame.

For example, the first AP receives the PS-Poll frame or the multi-link PS-Poll frame from the second STA operating on the secondary link, and may determine that the second STA operating on the secondary link is in an awake state.

S535: The first AP sends the downlink traffic to the second STA operating on the secondary link in a unicast manner.

The downlink traffic is sent to the second STA operating on the secondary link in a unicast manner.

S536: The second STA operating on the secondary link receives the downlink traffic.

For example, the second STA operating on the secondary link may receive downlink traffic data from the first AP. The second STA operating on the secondary link may forward the received downlink traffic data to the second STA operating on the primary link.

It may be understood that, when the first AP transmits, over the secondary link, the downlink multicast traffic to the second STA operating on the primary link, the second STA operating on the secondary link sends the fourth frame to the first AP after entering an awake state, to indicate the first AP to send the downlink multicast traffic to the second STA operating on the secondary link in a unicast manner. Then, the second STA operating on the secondary link receives the downlink multicast traffic transmitted by the first AP on the secondary link. The second STA operating on the secondary link may forward the received downlink traffic data to the second STA operating on the primary link.

Figure 13:
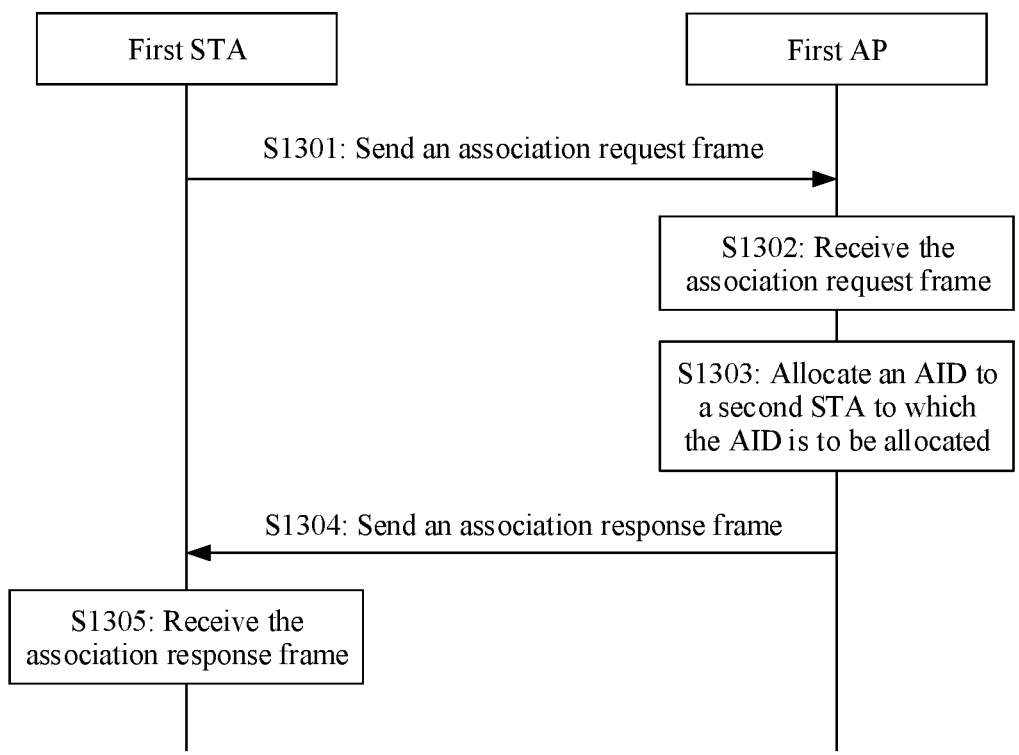
FIG. 13 is a schematic flowchart of still yet another communication method between multi-link devices according to an embodiment of this application.

An embodiment of this application further provides an association identifier AID allocation method. As shown in FIG. 13, the method includes steps S1301 to S1305.

S1301: A first STA sends an association request frame to a first AP.

The association request frame carries at least one of a quantity of second STAs to which AIDs are to be allocated or identifier information of a link on which the second STA operates.

For example, the second STAs to which AIDs are to be allocated may be some or all second STAs in the first STA. The first STA may add, to the association request frame, the quantity of second STAs to which AIDs are to be allocated, and/or identifier information of a link on which each second STA to which an AID is to be allocated operates.

Optionally, the association request frame may also carry capability information of the first STA, where the capability information includes all second STAs included in the first STA, and the identifier information of the link on which each second STA operates. It may be understood that when the association request frame carries the capability information of the first STA, it may be considered that the first STA implicitly indicate the first AP to allocate AIDs to all the second STAs.

For example, the association request frame may carry an element, and the element includes the quantity of second STAs to which AIDs are to be allocated, and/or the identifier information of the link on which each second STA to which an AID is to be allocated operates. The link identifier information includes one or more of a link identifier (link ID), a combination of an operating class and a channel number, a MAC address (or a BSSID), and the like. The element may be obtained by modifying an element (for example, a multi-band element) in the conventional technology, or may be a new element. First three fields of the new element are an element ID field, a length field, and an element ID extension field.

For example, a link on which the first STA sends the association request frame to the first AP may be a primary link. Optionally, the association request frame may further carry identifier information of the primary link determined by the first STA.

S1302: The first AP receives the association request frame from the first STA.

For example, the first AP receives the association request frame from the first STA, and determines, based on the association request frame, the quantity of second STAs to which AIDs are to be allocated, and/or the identifier information of the link on which the second STA to which the AID is to be allocated operates.

S1303: The first AP allocates an AID to the second STA to which the AID is to be allocated.

For example, in a case in which the first AP allocates an AID to the second STA to which the AID is to be allocated, an AID in one BSS is unique.

For example, when a value of a first bit in a bitmap control field in a TIM element is 1, which indicates that a second STA operating on the primary link has a downlink multicast traffic, the first AP may allocate one AID to the second STA operating on the primary link. The AID is used to indicate whether the second STA operating on the primary link has a downlink unicast traffic. In addition, the first AP allocates one or two AIDs to a second STA operating on a secondary link. In an implementation in which the first AP allocates one AID to the second STA operating on the secondary link, whether a bit corresponding to an AID of the second STA in a partial virtual bitmap field in the TIM element is set to 1 is used to indicate whether the second STA has a downlink unicast traffic or a downlink multicast traffic. In other words, the one AID allocated by the first AP to the second STA operating on the secondary link corresponds to both the downlink unicast traffic and the downlink multicast traffic. In an implementation in which the first AP allocates two AIDs to the second STA operating on the secondary link, one AID is used to indicate whether the second STA operating on the secondary link has a downlink unicast traffic, and the other AID is used to indicate whether the second STA operating on the secondary link has a downlink multicast traffic.

For example, when a value of the first bit in the bitmap control field in the TIM element is 1, which indicates that the first STA has a downlink multicast traffic, the downlink multicast traffic may be sent to the second STA operating on the primary link or the second STA operating on the secondary link. In this implementation, the first AP may allocate one AID to the second STA operating on the primary link, where the AID is used to indicate whether the second STA operating on the primary link has a downlink unicast traffic; and the first AP allocates one AID to the second STA operating on the secondary link, where the AID is used to indicate that the second STA operating on the secondary link has a downlink unicast traffic.

For example, when the first STA includes one second STA, if the second STA can operate in different frequency bands, the first AP allocates one AID for each frequency band to the second STA. In other words, AIDs corresponding to the second STA operating in different frequency bands are different from each other.

S1304: The first AP sends an association response frame to the first STA.

The association response frame carries the AID allocated to each second STA to which an AID is to be allocated.

For example, the association response frame sent by the first AP to the first STA carries an element. The element carries the quantity of second STAs to which AIDs are to be allocated. The element may further include the AID allocated to each second STA to which an AID is to be allocated. Optionally, the element may further include the identifier information of the link on which the second STA to which the AID is to be allocated operates. A quantity of AIDs allocated to each second STA to which an AID is to be allocated is one or two. The quantity of second STAs to which an AID is to be allocated may be a quantity of second STAs other than the second STA operating on the primary link in the first STA, or may be a quantity of all the second STAs in the first STA.

For example, the element included in the association response frame and the element included in the association request frame may be of a same structure. In this case, one bit is required in the element to indicate whether the element is used for a request or a response. For example, a first value and a second value may be used to respectively indicate the association request frame and the association response frame. Optionally, the element included in the association response frame may be different from the element included in the association request frame. This is not limited in this embodiment of this application.

S1305: The first STA receives the association response frame from the first AP.

For example, the first STA receives the association response frame from the first AP, and obtains an AID corresponding to the second STA to which the AID is to be allocated. Therefore, after receiving a beacon frame, the second STA operating on the primary link in the first STA may determine, based on an AID indicated in a TIM element field in the beacon frame, whether a second STA corresponding to the AID has a downlink traffic.

It should be noted that the AID allocation method in this embodiment of this application may be applied to or combined with the foregoing embodiments.

In this embodiment, as the first AP may allocate different AIDs to different second STAs in one BSS, by determining whether bits that are corresponding to different AIDs and that are in the virtual bitmap field in the TIM element are set to 1, a second STA in a station multi-link device that has a downlink traffic can be determined. Therefore, a frame format of the beacon frame or another management frame does not need to be changed, and compatibility is better.

Figure 14:
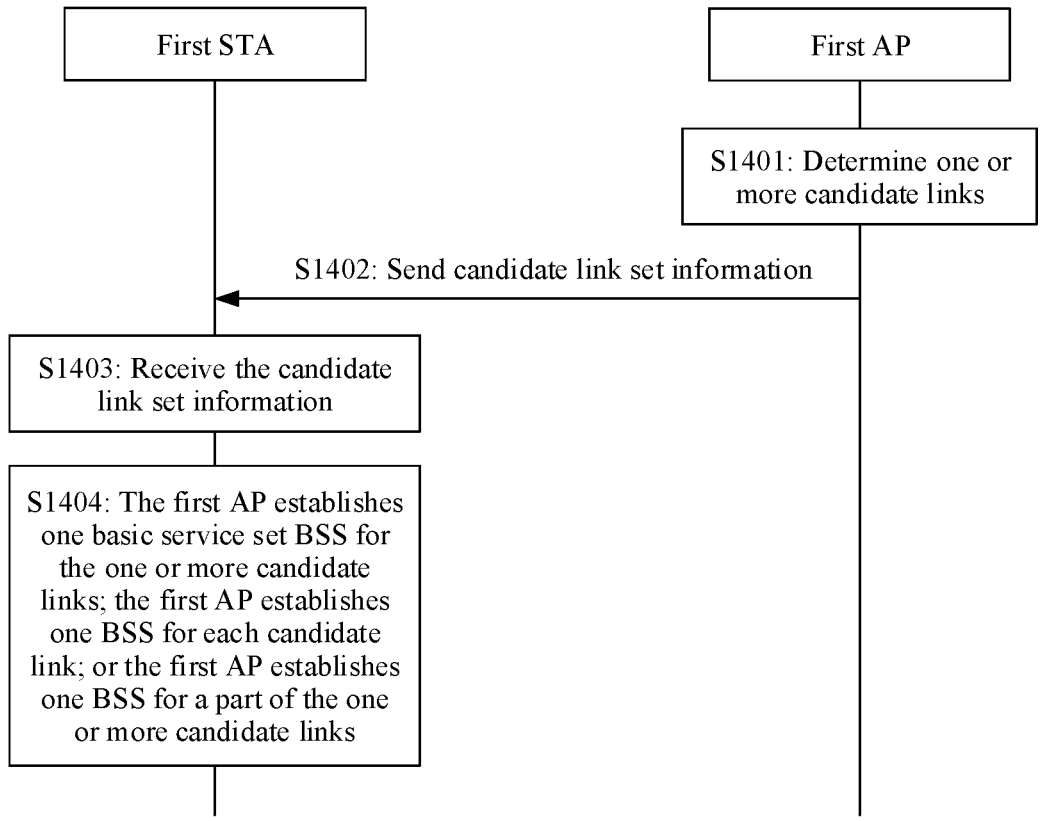
FIG. 14 is a schematic flowchart of a further communication method between multi-link devices according to an embodiment of this application.

An embodiment of this application further provides a communication method between multi-link devices. As shown in FIG. 14, the method may further include steps S1401 to S1404 before step S501.

S1401: A first AP determines one or more candidate links.

The one or more candidate links may be links in a plurality of links on which the first AP operates. In other words, the first AP may operate on the one or more candidate links. For example, that the first AP determines one or more candidate links may include: The first AP determines some or all links on which the first AP can operate as candidate links.

For example, with reference to FIG. 6, the first AP is the AP multi-link device, the AP multi-link device may communicate with the STA 1 over the link 1, communicate with the STA multi-link device 2 over the link 2 and the link 3, and communicate with the STA multi-link device 3 over the link 1 and the link 3. If the link 2 and the link 3 do not support simultaneous sending and receiving, the AP multi-link device may group the link 1 and the link 2 as a candidate link set. The AP multi-link device may alternatively group the link 1 and the link 3 as the candidate link set. An example in which the AP multi-link device groups the link 1 and the link 2 as the candidate link set is merely used for description herein. The one or more candidate links include the link 1 and the link 2.

S1402: The first AP sends candidate link set information to the first STA.

For example, the candidate link set information may include identifier information of the one or more candidate links. The candidate link set information may be carried in a beacon frame or another management frame.

Optionally, the beacon frame or the another management frame may further carry channel utilization information corresponding to the candidate link.

Optionally, the candidate link set information in step S1402 and downlink traffic indication information in step S503 may be carried in one beacon frame, or may be carried in different beacon frames.

Optionally, the first AP may send capability information of the first AP to the first STA, where the capability information of the first AP includes all links on which the first AP can operate, and the first STA may use all the links in the capability information as candidate links, to determine a primary link from the links included in the capability information.

S1403: The first STA receives the candidate link set information from the first AP.

Correspondingly, that the first STA determines a primary link in step S501 includes: The first STA determines the primary link from the one or more candidate links based on the candidate link set information.

With reference to FIG. 6, for example, the candidate link set information includes identifier information of the link 1 and the link 2. The first STA may determine the link 2 as the primary link based on channel utilization information corresponding to the link 1 and the link 2.

Optionally, in this embodiment of this application, the first STA may group some or all links on which the first STA can operate as the candidate link set, and send information about the candidate link set to the first AP. Then, the first AP determines the primary link from the candidate link set, and sends identifier information of the primary link determined by the first AP to the first STA. In this implementation, the primary link determined by the first STA in step S501 may be a primary link that is determined by the first AP and received by the first STA from the first AP. A specific manner in which the first STA determines the primary link is not limited in this embodiment of this application, and is merely an example for description herein.

Optionally, S1404: The first AP establishes a basic service set BSS for the one or more candidate links; the first AP establishes one BSS for each candidate link; or the first AP establishes one BSS for a part of the one or more candidate links. An AID allocated to one STA in one BSS is unique.

For example, the first AP may establish one BSS for each candidate link in the candidate link set in an implementation. For example, with reference to FIG. 6, in an example in which the candidate links include the link 1, the link 2, and the link 3, the first AP may establish one BSS for each candidate link. For example, a BSS 1 is established for the link 1, a BSS 2 is established for the link 2, and a BSS 3 is established for the link 3.

For example, the first AP may establish one BSS for some candidate links in the candidate link set in another implementation. For example, with reference to FIG. 6, in an example in which the candidate links include the link 1, the link 2, and the link 3, the first AP may establish a BSS 1 for the link 1 and the link 2.

For example, the first AP may establish one BSS for all candidate links in the candidate link set in still another implementation. For example, with reference to FIG. 6, in an example in which the candidate link include the link 1, the link 2, and the link 3, the first AP may establish one BSS for the link 1, the link 2, and the link 3, which is denoted as a BSS 1.

For example, when the first AP establishes one BSS for each candidate link in the candidate link set, after selecting a primary link, the STA multi-link device joins a BSS corresponding to the primary link. For example, with reference to FIG. 6, that the first AP respectively establishes the BSS 1, the BSS 2, and the BSS 3 on the link 1, the link 2, and the link 3, and a primary link selected by the STA multi-link device 2 is the link 2 is used as an example. In this case, after selecting the link 2 as the primary link, the STA multi-link device 2 joins the BSS 2.

For example, when the first AP establishes one BSS for some or all candidate links in the candidate link set, both a STA multi-link device that selects a link in the candidate link set as the primary link and a conventional STA joins the BSS. For example, with reference to FIG. 6, that the first AP establishes the BSS 1 on the link 1, the link 2, and the link 3, and the primary link selected by the STA multi-link device 2 is the link 2 is used as an example. In this case, after selecting the link 2 as the primary link, the STA multi-link device 2 joins the BSS 1.

It should be noted that, when allocating an AID to a second STA, the first AP should meet that AIDs of a plurality of second STAs belonging to one BSS are different from each other, so that different second STAs in one BSS can be identified.

It should be noted that a sequence of performing steps S1402 and S1403, and step S1404 is not limited in this embodiment of this application. In FIG. 13, that steps S1402 and S1403 are performed before step S1404 is used an example for description. Optionally, after determining the one or more candidate links, the first AP may establish a BSS for the one or more candidate links.

In this embodiment of this application, the first AP sends the candidate link set information to the first STA. After receiving the candidate link set information, the first STA selects a primary link from the plurality of links included in the candidate link set. In addition, the second STA operating on the primary link may receive information indicating whether the second STA operating on the primary link has a downlink traffic, and information indicating whether a second STA operating on a secondary link has a downlink traffic. Therefore, the second STA operating on the secondary link may not receive, on the secondary link on which the second STA operates, information indicating whether there is a downlink traffic on the secondary link. In other words, when no data is transmitted, the second STA operating on the secondary link may enter a doze state. This reduces power consumption of the station multi-link device.

Generally, before sending data, a station needs to determine whether a network allocation vector (NAV) is set for the station (which is referred to as virtual carrier sensing) and sense whether a channel is idle (which is referred to as physical carrier sensing). When the NAV is not set and the sensed channel is idle, the station senses the channel for X interframe space (XIFS) time and then backs off. The station can preempt the channel and send data only when a counter backs off to 0.

The XIFS time herein is related to a traffic type to be sent. For example, if a to-be-sent frame is a response frame, for example, an acknowledgment (Ack), a block acknowledgment (Block Ack), or a clear to send (CTS) frame, the XIFS time is SIFS (short IFS) time. In this case, the station does not need to back off and may directly preempt the channel for sending. If the to-be-sent frame is a beacon frame, and the XIFS time is PIFS (point coordination function (PCF) IFS) time, the station does not need to back off and may directly preempt the channel for sending. If the to-be-sent frame is conventional non-quality of service (QoS) data, and the XIFS time is DIFS (distributed coordination function (DCF) IFS) time, the station backs off, and preempts the channel for sending until a backoff counter backs off to 0 in a conventional way. If the to-be-sent frame is conventional QoS data, and the XIFS time is arbitration interframe space (IFS, AIFS) time, the station backs off, and can obtain a channel transmission opportunity when a backoff counter backs off to 0. A QoS data access category (AC) is further classified into AC_BK (background), AC_BE (best effort), AC_VI (video), and AC_VO (voice). For different access categories of data, backoff counts are different, and AIFS time is different. The AIFS time is separately AIFS [AC_BK], AIFS[AC_BE], AIFS[AC_VI], and AIFS [AC_VO], and the backoff counts are separately backoff [AC_BK], backoff [AC_BE], backoff [AC_VI], and backoff [AC_VO]. A time length sequence is (SIFS<PIFS<DIFS=AIFS[AC_VO]<AIFS[AC_VI]<AIFS [AC_BE]<AIFS[AC_BK]), indicating priorities of different traffic.

The station maintains a contention window (cw) CW[AC] for each access category AC during data transmission, and a value of the window is within [CW_min[AC], CW_max [AC]]. During initialization, the contention window is CW=CW_min. If data fails to be sent, CW=(CW+1)×2−1 until the value of the CW reaches CW_max. If the data is sent successfully, the CW is reset to CW_min. A random number is selected from [0, CW], and is used as the backoff counter to perform backoff. If the sensed channel is idle, the backoff counter is subtracted by 1. Until the backoff counter reaches 0, a data frame can be sent. If the channel is busy, the backoff counter is suspended. When the channel becomes idle, the suspended backoff counter is used to perform backoff again. It is assumed that data including an MSDU (MAC service data unit), an A-MSDU (aggregate MAC service data unit), and an MMPDU (management MAC protocol data unit) that are not in an acknowledgment protocol fails to be transmitted. If a length of an incorrectly transmitted data packet is less than or equal to an RTS (request to send) threshold, a short retry counter of the data packet is incremented by 1. If the length of an incorrectly transmitted data packet is greater than the RTS (request to send) threshold, a long retry counter is incremented by 1. If the short retry counter or the long retry counter reaches a specified upper limit, a transmit end discards the data transmission. In addition, the station maintains a station short retry counter [AC] and a station long retry counter [AC] for each access category of data. If a short retry counter of a data packet belonging to a category [AC] is incremented by 1, the short retry counter [AC] is increased by one; if a long retry counter of a data packet belonging to a category [AC] is incremented by 1, the long retry counter [AC] is incremented by 1. In another implementation, the short retry counter and the long retry counter are combined. A retry counter field is maintained for each data packet. If the retry counter field reaches the upper limit, the packet retransmission is discarded. The station maintains a station retry counter [AC] field for each category of data.

Figure 15:
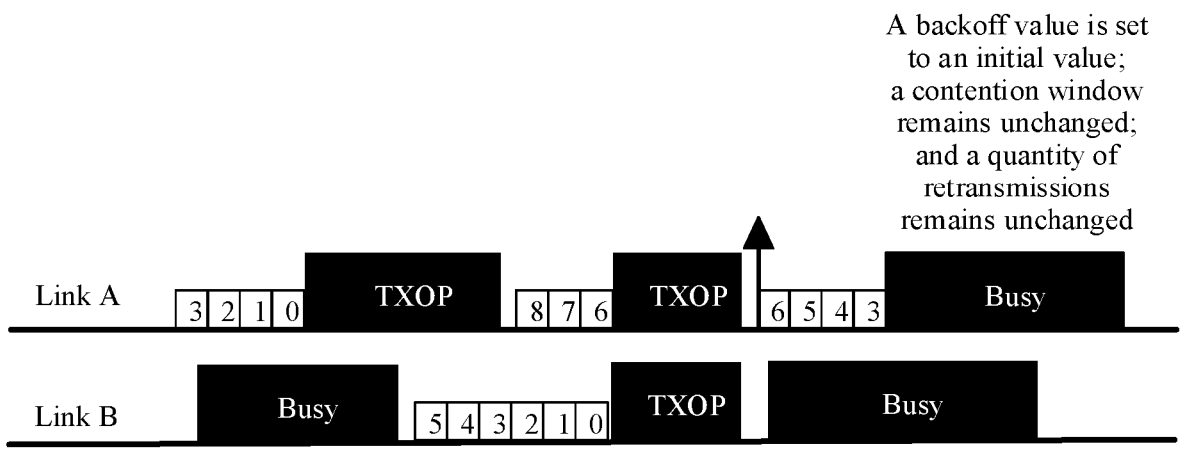
FIG. 15 is a schematic diagram of application of a communication method between multi-link devices according to an embodiment of this application.

A station multi-link device is used as an example. As shown in FIG. 15, during data transmission performed by the station multi-link device, when a station backoff counter of one link B is decreased to 0, if another link A is idle at this time, for example, the link A is idle within PIFS time, the station multi-link device can transmit data on two links (the link A and the link B) at the same time. Because the link A does not obtain a channel transmission opportunity through channel contention, if a channel contention method for a single link is still used in this case, a data sending success or error in this opportunity affects a sending opportunity of another station on the link A. This is unfair to the another station on the link. Therefore, in this embodiment of this application, when the link A does not obtain the channel transmission opportunity through channel contention, if data of a station operating on the link A in the station multi-link device is successfully sent (the data may be classified based on an access category), the contention window does not need to be reset to a minimum contention window but remains the same. If the data of the station operating on the link A in the station multi-link device fails to be sent, the contention window is not doubled and remains unchanged, and a value of the retry counter field remains unchanged, including a long retry counter field, a short retry counter field, a station long retry counter field [AC], a station short retry counter field [AC], a retry counter field, and a station retry counter field [AC]. This ensures access fairness for stations on the link A.

After the station operating on the link A in the station multi-link device completes data transmission, or a transmission opportunity (TXOP) preempted by a station operating on the link B in the station multi-link device is used up, the station multi-link device resets the backoff counter to the previous value or randomly selects a backoff counter from the previous contention window, to resume channel contention.

The foregoing mainly describes the solutions provided in the embodiments of this application from a perspective of method steps. It may be understood that, to implement the foregoing functions, a computer includes corresponding hardware structures and/or software modules for performing the functions. A person skilled in the art should be easily aware that, in combination with modules and algorithm steps of the examples described in the embodiments disclosed in this specification, this application can be implemented by a combination of hardware and computer software. A person skilled in the art may use different methods to implement the described functions for each particular application, but it should not be considered that the implementation goes beyond the scope of this application.

In the embodiments of this application, division into functional modules may be performed on the first STA and the first AP based on the foregoing method example. For example, each functional module may be obtained through division corresponding to each function, or two or more functions may be integrated into one processing module. The integrated module may be implemented in a form of hardware, or may be implemented in a form of a software function module. It should be noted that division into modules in the embodiments of this application is an example, and is merely a logical function division. During actual implementation, another division manner may be used.

Figure 16:
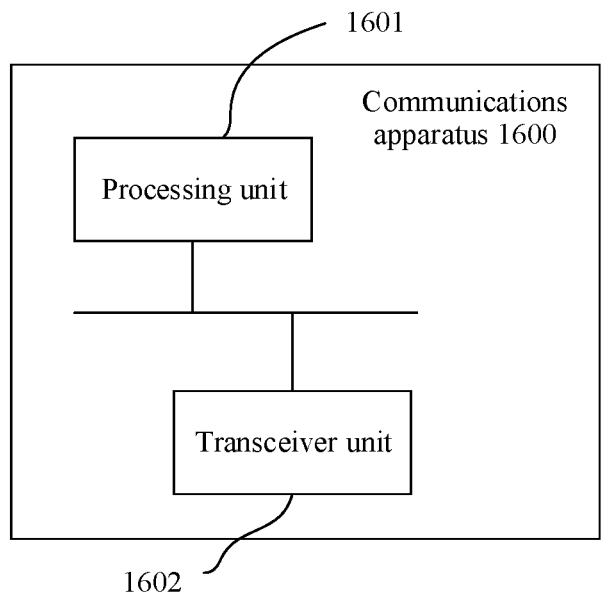
FIG. 16 is a schematic diagram of composition of a communications apparatus according to an embodiment of this application.

In a case in which an integrated unit is used, FIG. 16 shows a possible schematic diagram of a structure of a communications apparatus 1600. The communications apparatus 1600 may be a station or a chip used for a station. The communications apparatus 1600 may perform operations of a first STA, a second STA operating on a primary link, or a second STA operating on a secondary link in the foregoing method embodiment. The communications apparatus 1600 includes a processing unit 1601 and a transceiver unit 1602.

The processing unit 1601 may be configured to control and manage an action of the communications apparatus 1600, for example, determine the primary link. For another example, the processing unit 1601 may be configured to control an operation of the transceiver unit 1602. Optionally, if the communications apparatus 1600 includes a storage unit, the processing unit 1601 may further execute a program or instructions stored in the storage unit, so that the communications apparatus 1600 implements the method and the function in any foregoing embodiment.

Figure 5:
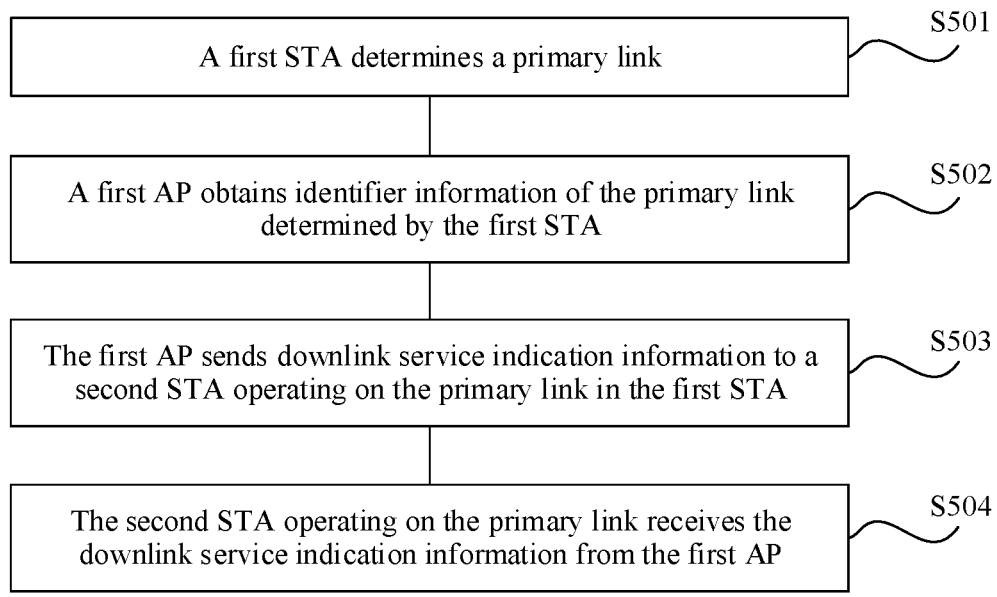
FIG. 5 is a schematic flowchart of a communication method between multi-link devices according to an embodiment of this application.

For example, the processing unit 1601 may be configured to perform, for example, step S501 in FIG. 5, step S505 in FIG. 9, step S511 in FIG. 10, step S521 in FIG. 11, step S527 in FIG. 12, step S1404 in FIG. 14, and/or other processes used in the technologies described in this specification. All related content of the steps in the foregoing method embodiments may be cited in function descriptions of corresponding function modules. Details are not described herein again.

For example, the transceiver unit 1602 may send and receive data of a first STA (the communications apparatus 1600) transmitted on the primary link, or may send and receive data of a first STA (the communications apparatus 1600) transmitted on the secondary link. Optionally, the transceiver unit 1602 may be one transceiver module, or may include two transceiver modules. When the transceiver unit 1602 is a transceiver module, the transceiver module may send and receive data of the first STA (the communications apparatus 1600) transmitted on the primary link, or may send and receive data of the first STA (the communications apparatus 1600) transmitted on the secondary link. When the transceiver unit 1602 includes two transceiver modules, one transceiver module is configured to send and receive data of the first STA (the communications apparatus 1600) transmitted on the primary link, and the other transceiver module is configured to send and receive data of the first STA (the communications apparatus 1600) transmitted on the secondary link.

For example, the transceiver unit 1602 may be configured to perform, for example, step S504 in FIG. 5, steps S506, S509, and S510 in FIG. 9, steps S512, S515, S516, S517, and S520 in FIG. 10, steps S522, S525, and S526 in FIG. 11, steps S528, S531, S532, S533, and S536 in FIG. 12, steps S1301 and S1305 in FIG. 13, step S1403 in FIG. 14, and/or other processes used in the technologies described in this specification. All related content of the steps in the foregoing method embodiments may be cited in function descriptions of corresponding function modules. Details are not described herein again.

For example, the communications apparatus 1600 may be the communications apparatus shown in FIG. 4, the processing unit 1601 may be the processor 401 in FIG. 4, and the transceiver unit 1602 may be the transceiver 403 in FIG. 4. Optionally, the communications apparatus 1600 may further include a memory. The memory is configured to store corresponding program code and data for the communications apparatus 1600 to perform any communication method between multi-link devices provided above. Descriptions of all related content of the components in FIG. 4 may be cited in function descriptions of corresponding components of the communications apparatus 1600, and details are not described herein again.

Figure 17:
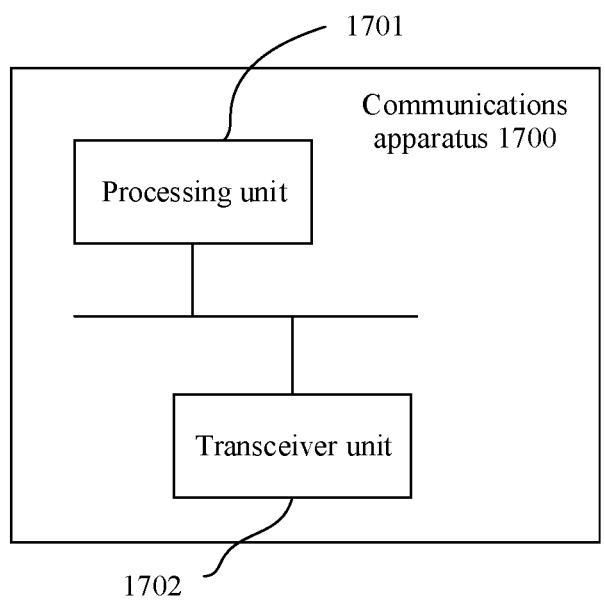
FIG. 17 is a schematic diagram of composition of another communications apparatus according to an embodiment of this application.

In a case in which an integrated unit is used, FIG. 17 shows a possible schematic diagram of a structure of a communications apparatus 1700. The communications apparatus 1700 may be an access point device or a chip used for an access point device, and the communications apparatus 1700 may perform an operation of the first AP in the foregoing method embodiment. The communications apparatus 1700 includes a processing unit 1701 and a transceiver unit 1702.

The processing unit 1701 may be configured to control and manage an action of the communications apparatus 1700. For another example, the processing unit 1701 may be configured to control an operation of the transceiver unit 1702. Optionally, if the communications apparatus 1700 includes a storage unit, the processing unit 1701 may further execute a program or instructions stored in the storage unit, so that the communications apparatus 1700 implements the method and the function in any foregoing embodiment.

For example, the processing unit 1701 may be configured to perform, for example, step S502 in FIG. 5, step S1303 in FIG. 13, step S1401 in FIG. 14, and/or other processes used in the technologies described in this specification. All related content of the steps in the foregoing method embodiments may be cited in function descriptions of corresponding function modules. Details are not described herein again.

For example, the transceiver unit 1702 may be configured to perform, for example, step S503 in FIG. 5, steps S507 and S508 in FIG. 9, steps S513, S514, S518, and S519 in FIG. 10, steps S523 and S524 in FIG. 11, steps S529, S530, S534, and S535 in FIG. 12, steps S1302 and S1304 in FIG. 13, step S1402 in FIG. 14; and/or other processes used in the technologies described in this specification. All related content of the steps in the foregoing method embodiments may be cited in function descriptions of corresponding function modules. Details are not described herein again.

For example, the communications apparatus 1700 may be the communications apparatus shown in FIG. 4, the processing unit 1701 may be the processor 401 in FIG. 4, and the transceiver unit 1702 may be the transceiver 403 in FIG. 4. Optionally, the communications apparatus 1700 may further include a memory. The memory is configured to store corresponding program code and data for the communications apparatus 1700 to perform any communication method between multi-link devices provided above. Descriptions of all related content of the components in FIG. 4 may be cited in function descriptions of corresponding components of the communications apparatus 1700, and details are not described herein again.

An embodiment of this application further provides a communications apparatus. The communications apparatus includes a processor, and may further include a transceiver and a memory. The transceiver is configured to send and receive information, or configured to communicate with another network element. The memory is configured to store computer-executable instructions. The processor is configured to execute the computer-executable instructions, to support a station in implementing the communication method between multi-link devices in any one of the embodiments in FIG. 5 and FIG. 9 to FIG. 14.

An embodiment of this application further provides a communications apparatus. The communications apparatus includes a processor, and may further include a transceiver and a memory. The transceiver is configured to send and receive information, or configured to communicate with another network element. The memory is configured to store computer-executable instructions. The processor is configured to execute the computer-executable instructions, to support an access point device in implementing the communication method between multi-link devices in any one of the embodiments in FIG. 5 and FIG. 9 to FIG. 14.

An embodiment of this application further provides a computer-readable storage medium. The computer-readable storage medium stores computer program code. When the foregoing processor executes the computer program code, an electronic device performs the communication method between multi-link devices in any one of the embodiments in FIG. 5 and FIG. 9 to FIG. 14.

An embodiment of this application further provides a computer program product. When the computer program product is run on a computer, the computer performs the communication method between multi-link devices in any one of the embodiments in FIG. 5 and FIG. 9 to FIG. 14.

An embodiment of this application further provides a communications apparatus. The apparatus may exist in a product form of a chip. A structure of the apparatus includes a processor and an interface circuit. The processor is configured to communicate with another apparatus by using a receiving circuit, so that the apparatus performs the communication method between multi-link devices in any one of the foregoing embodiments in FIG. 5 and FIG. 9 to FIG. 14.

An embodiment of this application further provides a communications system, including an access point and a station. The access point and the station may perform the communication method between multi-link devices in any one of the foregoing embodiments in FIG. 5 and FIG. 9 to FIG. 14.

The method or algorithm steps described with reference to the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in an interface device of a core network. Certainly, the processor and the storage medium may alternatively exist in the interface device of the core network as discrete components.

A person skilled in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communications medium. The communications medium includes any medium that facilitates transmission of a computer program from one place to another. The storage medium may be any available medium accessible to a general-purpose or dedicated computer.

The objectives, the technical solutions, and the benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

What is claimed is:

1. A communication method between multi-link devices, applied to a first station (STA) multi-link device, wherein the first STA multi-link device comprises one or more second STAs, the one or more second STAs share an association identifier (AID), the method comprises:

receiving, by the first STA multi-link device, downlink traffic indication information sent by a first access point (AP) multi-link device,
wherein the first STA multi-link device communicates with the first AP multi-link device over a plurality of links,
wherein one second STA included in the first STA multi-link device operates on one of the plurality of links, and
wherein the downlink traffic indication information comprises information indicating whether the first STA multi-link device has downlink unicast traffic; and determining, by the first STA multi-link device based on the downlink traffic indication information, whether the one or more second STAs should receive the downlink unicast traffic,
wherein the downlink traffic indication information is carried in a traffic indication map (TIM) element field in a management frame,
wherein the TIM element field comprises a partial virtual bitmap field,
wherein the partial virtual bitmap field comprises a bit that is associated with the AID, and the bit indicates whether the first STA multi-link device has the downlink unicast traffic, and
wherein the management frame further comprises a multi-link identifier bitmap field that indicates one or more links of the first STA multi-link device to receive a downlink unicast traffic.

2. The method according to claim 1, wherein one bit in the multi-link identifier bitmap field is associated with one link; and
in response to a value of the bit being 1, indicating the link associated with the bit to receive the downlink unicast traffic, or in response to a value of the bit being 0, indicating the link associated with the bit not to receive the downlink unicast traffic.

3. The method according to claim 1, wherein the management frame comprises a beacon frame or a TIM frame.

4. The method according to claim 1, further comprising:
sending, by the first STA multi-link device, a media access control (MAC) frame to the first AP multi-link device,
wherein the MAC frame comprises a frame control field,
wherein the frame control field comprises power management information that is configured to indicate whether a second STA affiliated with the first STA multi-link device is in a power-saving mode or a non-power-saving mode, and
wherein a setting of the power-saving mode or the non-power-saving mode of each second STA is independent of a setting of the other second STAs of the first multi-link STA.

5. The method according to claim 1, further comprising receiving, by a second STA, the downlink traffic indication information on a primary link or a secondary link.

6. A communication method between multi-link devices, the method comprising:
sending, by a first access point (AP) multi-link device, downlink traffic indication information to a first station (STA) multi-link device,
wherein the first STA multi-link device comprises one or more second STAs,
wherein the one or more second STAs share an association identifier (AID), and wherein the first STA multi-link device communicates with the first AP multi-link device over a plurality of links,
wherein one second STA included in the first STA multi-link device operates on one of the plurality of links, and
wherein the downlink traffic indication information comprises information indicating whether the first STA multi-link device has a downlink unicast traffic; and
sending, by the first AP multi-link device, the downlink unicast traffic,
 wherein the downlink traffic indication information is carried in a traffic indication map (TIM) element field in a management frame,
 wherein the TIM element field comprises a partial virtual bitmap field,
 wherein the partial virtual bitmap field comprises a bit that is associated with the AID, and the bit indicates whether the first STA multi-link device has the downlink unicast traffic, and
 wherein the management frame further comprises a multi-link identifier bitmap field that indicates one or more links of the first STA multi-link device to receive a downlink unicast traffic.

7. The method according to claim 6, wherein the multi-link identifier bitmap field comprises one or more bits, one bit in the multi-link identifier bitmap field is associated with one link; and
 in response to a value of the bit being 1, indicating the link associated with the bit to receive the downlink unicast traffic, or in response to a value of the bit is 0, indicating the link associated with the bit not to receive the downlink unicast traffic.

8. The method according to claim 6, wherein the management frame comprises a beacon frame or a TIM frame.

9. The method according to claim 6, further comprising receiving, by the first AP multi-link device, a media access control (MAC) frame,
 wherein the MAC frame comprises a frame control field,
 wherein the frame control field comprises power management information which is configured to indicate whether a second STA affiliated with the first STA multi-link device that sent the MAC frame is in a power-saving mode or a non-power-saving mode, and
 wherein a setting of the power-saving mode or the non-power-saving mode of each second STA is independent of a setting of the other second STAs of the first multi-link STA.

10. The method according to claim 6, further comprising sending, by the first AP multi-link device, the downlink traffic indication information on a primary link or a secondary link.

11. A communications apparatus, applied to a first station (STA) multi-link device, wherein the first STA multi-link device comprises one or more second STAs, the one or more second STAs share an association identifier (AID), the apparatus comprises:
 a transceiver and a processor,
  wherein the transceiver is configured to cooperate with the processor to receive downlink traffic indication information sent by a first access point (AP) multi-link device,
  wherein the first STA multi-link device communicates with the first AP multi-link device over a plurality of links,
  wherein one second STA included in the first STA multi-link device operates on one of the plurality of links, and
  wherein the downlink traffic indication information comprises information indicating whether the first STA multi-link device has a downlink unicast traffic;
 the processor is configured to determine whether the one or more second STAs should receive the downlink unicast traffic based on the downlink traffic indication information,
  wherein the downlink traffic indication information is carried in a traffic indication map (TIM) element field in a management frame,
  wherein the TIM element field comprises a partial virtual bitmap field,
  wherein the partial virtual bitmap field comprises a bit that is associated with the AID, and the bit indicates whether the first STA multi-link device has the downlink unicast traffic, and
  wherein the management frame further comprises a multi-link identifier bitmap field that indicates one or more links of the first STA multi-link device to receive a downlink unicast traffic.

12. The method according to claim 11, wherein one bit in the multi-link identifier bitmap field is associated with one link; and
 in response to a value of the bit being 1, indicating the link associated with the bit to receive the downlink unicast traffic, or in response to a value of the bit is 0, indicating the link associated with the bit not to receive the downlink unicast traffic.

13. The apparatus according to claim 11, wherein the management frame comprises a beacon frame or a TIM frame.

14. The apparatus according to claim 11, wherein the transceiver is further configured to cooperate with the processor to send a media access control (MAC) frame to the first AP multi-link device,
 wherein the MAC frame comprises a frame control field,
 wherein the frame control field comprises power management information which is configured to indicate whether a second STA affiliated with the first STA multi-link device is in a power-saving mode or a non-power-saving mode, and
 wherein a setting of the power-saving mode or the non-power-saving mode of each second STA is independent of a setting of the other second STAs of the first multi-link STA.

15. The apparatus according to claim 11, wherein the transceiver is further configured to receive the downlink traffic indication information on a primary link or a secondary link.

16. A communication apparatus comprising:
 sending, by a first access point (AP) multi-link device, downlink traffic indication information to a first station (STA) multi-link device,
 wherein the first STA multi-link device comprises one or more second STAs,
 wherein the one or more second STAs share an association identifier (AID), and
 wherein the first STA multi-link device communicates with the first AP multi-link device over a plurality of links,
 wherein one second STA included in the first STA multi-link device operates on one of the plurality of links,
 wherein the downlink traffic indication information comprises information indicating whether the first STA multi-link device has a downlink unicast traffic; and
 sending, by the first AP multi-link device, the downlink unicast traffic, wherein the downlink traffic indication information is carried in a traffic indication map (TIM) element field in a management frame,
wherein the TIM element field comprises a partial virtual bitmap field,
wherein the partial virtual bitmap field comprises a bit that is associated with the AID, and the bit indicates whether the first STA multi-link device has the downlink unicast traffic, and
wherein the management frame further comprises a multi-link identifier bitmap field that indicates one or more links of the first STA multi-link device to receive a downlink unicast traffic.

17. The method according to claim 16, wherein the multi-link identifier bitmap field comprises one or more bits, one bit in the multi-link identifier bitmap field is associated with one link; and
in response to a value of the bit being 1, indicating the link associated with the bit to receive the downlink unicast traffic, or in response to a value of the bit is 0, indicating the link associated with the bit not to receive the downlink unicast traffic.

18. The apparatus according to claim 16, wherein the management frame comprises a beacon frame or a TIM frame.

19. The apparatus according to claim 16, wherein the transceiver is further configured to cooperate with the processor to receive a media access control (MAC) frame,
wherein the MAC frame comprises a frame control field comprising power management information that is configured to indicate whether a second STA affiliated with the first STA multi-link device that sent the MAC frame is in a power-saving mode or a non-power-saving mode, and
wherein a setting of the power-saving mode or the non-power-saving mode of each second STA is independent of a setting of the other second STAs of the first multi-link STA.

20. The apparatus according to claim 16, wherein the transceiver is further configured to cooperate with the processor to send the downlink traffic indication information on a primary link or a secondary link.

21. A non-transitory computer-readable medium storing computer instructions, applied to a first station (STA) multi-link device, wherein the first STA multi-link device comprises one or more second STAs that share an association identifier (AID), which when executed by one or more processors, cause the one or more processors to perform operations including:
receive downlink traffic indication information sent by a first access point (AP) multi-link device,
wherein the first STA multi-link device communicates with the first AP multi-link device over a plurality of links,
wherein one second STA included in the first STA multi-link device operates on one of the plurality of links,
wherein the downlink traffic indication information comprises information indicating whether the first STA multi-link device has a downlink unicast traffic; and
determine whether the one or more second STAs should receive the downlink unicast traffic based on the downlink traffic indication information,
wherein the downlink traffic indication information is carried in a traffic indication map (TIM) element field in a management frame,
wherein the TIM element field comprises a partial virtual bitmap field,
wherein the partial virtual bitmap field comprises a bit that is associated with the AID, and the bit indicates whether the first STA multi-link device has the downlink unicast traffic, and
wherein the management frame further comprises a multi-link identifier bitmap field that indicates one or more links of the first STA multi-link device to receive a downlink unicast traffic.

22. The non-transitory computer-readable medium according to claim 21, wherein one bit in the multi-link identifier bitmap field is associated with one link; and
in response to a value of the bit being 1, indicating the link associated with the bit to receive the downlink unicast traffic, or in response to a value of the bit is 0, indicating the link associated with the bit not to receive the downlink unicast traffic.

23. The non-transitory computer-readable medium according to claim 21, wherein the management frame comprises a beacon frame or a TIM frame.

24. The non-transitory computer-readable medium according to claim 21, wherein the operations further include sending a media access control (MAC) frame to the first AP multi-link device,
wherein the MAC frame comprises a frame control field comprising power management information that is configured to indicate whether a second STA affiliated with the first STA multi-link device is in a power-saving mode or a non-power-saving mode, and
wherein a setting of the power-saving mode or the non-power-saving mode of each second STA is independent of a setting of the other second STAs of the first multi-link STA.

25. A non-transitory computer-readable medium storing computer instructions, which when executed by one or more processors, cause the one or more processors to perform operations including:
sending downlink traffic indication information to a first station (STA) multi-link device,
wherein the first STA multi-link device comprises one or more second STAs,
wherein the one or more second STAs share an association identifier (AID), and
wherein the first STA multi-link device communicates with the first AP multi-link device over a plurality of links,
wherein one second STA included in the first STA multi-link device operates on one of the plurality of links, and
wherein the downlink traffic indication information comprises information indicating whether the first STA multi-link device has a downlink unicast traffic; and
sending the downlink unicast traffic,
wherein the downlink traffic indication information is carried in a traffic indication map (TIM) element field in a management frame,
wherein the TIM element field comprises a partial virtual bitmap field,
wherein the partial virtual bitmap field comprises a bit that is associated with the AID, and the bit indicates whether the first STA multi-link device has the downlink unicast traffic, and
wherein the management frame further comprises a multi-link identifier bitmap field that indicates one or more links of the first STA multi-link device to receive a downlink unicast traffic.

26. The non-transitory computer-readable medium according to claim 25, wherein the multi-link identifier bitmap field comprises one or more bits, one bit in the multi-link identifier bitmap field is associated with one link; and
   in response to a value of the bit being 1, indicating the link associated with the bit to receive the downlink unicast traffic, or in response to a value of the bit is 0, indicating the link associated with the bit not to receive the downlink unicast traffic.

27. The non-transitory computer-readable medium according to claim 25, wherein the management frame comprises a beacon frame or a TIM frame.

28. The non-transitory computer-readable medium according to claim 25, wherein the operations further include:
   receiving a media access control (MAC) frame comprising a frame control field,
      wherein the frame control field comprises power management information that indicates whether a second STA affiliated with the first STA multi-link device that sent the MAC frame is in a power-saving mode or a non-power-saving mode, and
      wherein a setting of the power-saving mode or the non-power-saving mode of each second STA is independent of a setting of the other second STAs of the first multi-link STA.

* * * * *